(12) United States Patent
Koyanagi et al.

(10) Patent No.: US 11,889,034 B2
(45) Date of Patent: Jan. 30, 2024

(54) IMAGE READING APPARATUS

(71) Applicant: SEIKO EPSON CORPORATION, Tokyo (JP)

(72) Inventors: Noriyuki Koyanagi, Kitakyushu (JP); Keiichiro Fukumasu, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/935,989

(22) Filed: Sep. 28, 2022

(65) Prior Publication Data
US 2023/0097229 A1 Mar. 30, 2023

(30) Foreign Application Priority Data

Sep. 30, 2021 (JP) ................. 2021-160444

(51) Int. Cl.
*H04N 1/00* (2006.01)
*H04N 1/12* (2006.01)

(52) U.S. Cl.
CPC ..... *H04N 1/00602* (2013.01); *H04N 1/00236* (2013.01); *H04N 1/00907* (2013.01);
(Continued)

(58) Field of Classification Search
CPC ............. H04N 1/4426; H04N 1/00795; H04N 23/634; H04N 5/765; H04N 5/77; H04N 5/772; H04N 5/775; H04N 5/781; H04N 5/907; H04N 9/7921; H04N 9/8042; H04N 9/8047; H04N 9/8063; H04N 9/8205; H04N 1/00; H04N 1/4413; H04N 2201/0094; H04N 1/00132; H04N 1/00167; H04N 1/00172; H04N 1/00175; H04N 1/00188; H04N 1/00554; H04N 1/00557; H04N 1/0057; H04N 1/00602; H04N 1/121; H04N 1/6052; H04N 2201/0081; H04N 1/00002; H04N 1/00005; H04N 1/00037; H04N 1/00082; H04N 1/00135; H04N 1/00564; H04N 1/0084; H04N 1/00854; H04N 1/00867; H04N 1/00965; H04N 1/12; H04N 1/32101; H04N 1/00013; H04N 1/00018;
(Continued)

(56) References Cited

U.S. PATENT DOCUMENTS 4,918,537 A * 4/1990 Mori ................ G03G 15/04009
347/136
5,115,308 A * 5/1992 Onuki .................. H04N 1/1026
358/401
(Continued)

FOREIGN PATENT DOCUMENTS

JP 2009-527143 A 7/2009

*Primary Examiner* — Negussie Worku
(74) *Attorney, Agent, or Firm* — WORKMAN NYDEGGER

(57) ABSTRACT

Provided is an image reading apparatus including an apparatus main body including a reading portion that reads an image of a document being transported, and a main body supporting portion rotatably supporting the apparatus main body such that the apparatus main body is configured to take a plurality of postures, in which the apparatus main body includes at least one coupling portion to which a coupling target is coupled, and the coupling portion is provided on a side of the apparatus main body. The side intersects a rotation shaft line direction of the apparatus main body.

12 Claims, 16 Drawing Sheets

(52) U.S. Cl.
CPC ......... *H04N 1/00522* (2013.01); *H04N 1/121* (2013.01); *H04N 2201/0049* (2013.01); *H04N 2201/0081* (2013.01)

(58) Field of Classification Search
CPC ........... H04N 1/00127; H04N 1/00204; H04N 1/00206; H04N 1/00307; H04N 1/00411; H04N 1/00453; H04N 1/00456; H04N 1/00461; H04N 1/00519; H04N 1/00538; H04N 1/00559; H04N 1/00567; H04N 1/00599; H04N 1/00615; H04N 1/0066; H04N 1/1225; H04N 1/1235; H04N 1/21; H04N 1/2104; H04N 1/32122; H04N 1/387; H04N 1/44; H04N 1/4406; H04N 2201/0049; H04N 2201/0065; H04N 2201/0087; H04N 2201/3247; H04N 2201/325; H04N 1/00236; H04N 1/00241; H04N 1/00278; H04N 1/00347; H04N 1/00806; H04N 1/00843; H04N 1/00848; H04N 1/00859; H04N 1/00864; H04N 1/00875; H04N 1/00962; H04N 1/0414; H04N 1/0443; H04N 1/0473; H04N 1/1008; H04N 1/107; H04N 1/193; H04N 1/2338; H04N 1/2376; H04N 1/401; H04N 21/42646; H04N 21/4334; H04N 21/8455; H04N 2201/0034; H04N 2201/0036; H04N 2201/0056; H04N 2201/0063; H04N 2201/0074; H04N 2201/0084; H04N 2201/0086; H04N 2201/0406; H04N 2201/0408; H04N 2201/0412; H04N 2201/0422; H04N 2201/0471; H04N 2201/04736; H04N 2201/04767; H04N 2201/04794; H04N 2201/218; H04N 2201/3223; H04N 2201/3243; H04N 2201/3273; H04N 2201/33378; H04N 23/631; H04N 5/253; H04N 5/85; H04N 9/8227; G06F 3/1222; G06F 3/1238; G06F 18/00; G06F 21/445; G06F 21/6218; G06F 2211/007; G06F 2221/2141; G06F 3/0221; G06F 3/0362; G06F 3/0485; G06F 3/1203; G06F 3/1267; G06F 3/1271; G06F 3/128; G06F 3/167

USPC ........................................................ 358/474
See application file for complete search history.

(56) References Cited

U.S. PATENT DOCUMENTS

| | | | | |
|---|---|---|---|---|
| 5,475,504 | A * | 12/1995 | Ogura | H04N 1/00541 358/496 |
| 7,778,578 | B2 * | 8/2010 | Takuwa | G03G 15/0872 399/262 |
| 7,841,593 | B2 * | 11/2010 | Toba | G03G 15/6511 271/121 |
| 8,006,973 | B2 * | 8/2011 | Toba | G03G 15/602 271/10.09 |
| 11,595,539 | B2 * | 2/2023 | Fukumasu | H04N 1/00896 |
| 2002/0176121 | A1 * | 11/2002 | Takei | H04N 1/1013 358/497 |
| 2007/0188818 | A1 | 8/2007 | Westcott et al. | |
| 2008/0049271 | A1 * | 2/2008 | Carlson | H04N 1/0057 358/498 |
| 2008/0232841 | A1 * | 9/2008 | Murakoshi | G03G 15/5066 399/80 |
| 2011/0002016 | A1 * | 1/2011 | Kuno | H04N 1/00795 358/468 |
| 2019/0132464 | A1 * | 5/2019 | Miyauchi | H04N 1/00798 |
| 2020/0336617 | A1 * | 10/2020 | Yoshino | H04N 1/00564 |
| 2021/0329142 | A1 * | 10/2021 | Fukumasu | H04N 1/00037 |

* cited by examiner

IMAGE READING APPARATUS

The present application is based on, and claims priority from JP Application Serial Number 2021-160444, filed Sep. 30, 2021, the disclosure of which is hereby incorporated by reference herein in its entirety.

BACKGROUND

1. Technical Field

The present disclosure relates to an image reading apparatus that reads an image on a document.

2. Related Art

An example of an image reading apparatus is a sheet feed type scanner. Hereinafter, when simply referred to as a scanner, it refers to a sheet feed type scanner. As described in JP-T-2009-527143, some scanners are configured such that a posture (an inclination angle) of an apparatus main body is capable of being changed.

In a scanner in which the posture of the apparatus main body is capable of being changed, a coupling member such as a power cable or a communication cable tends to get in the way when the posture of the apparatus main body is changed. For example, when the posture of the apparatus main body is changed, the power cable or the communication cable may be in contact with a placement surface of the apparatus, which may become a load and make it difficult to change the posture of the apparatus main body.

SUMMARY

According to an aspect of the present disclosure, there is provided an image reading apparatus for solving the above problems includes: an apparatus main body including a reading portion that reads an image of a document being transported; and a main body supporting portion rotatably supporting the apparatus main body such that the apparatus main body is configured to take a plurality of postures, in which the apparatus main body includes at least one coupling portion to which a coupling target is coupled, and the coupling portion is provided on a side of the apparatus main body, the side intersecting a first direction along a rotation shaft of the apparatus main body.

DESCRIPTION OF EXEMPLARY EMBODIMENTS

Figure 1:
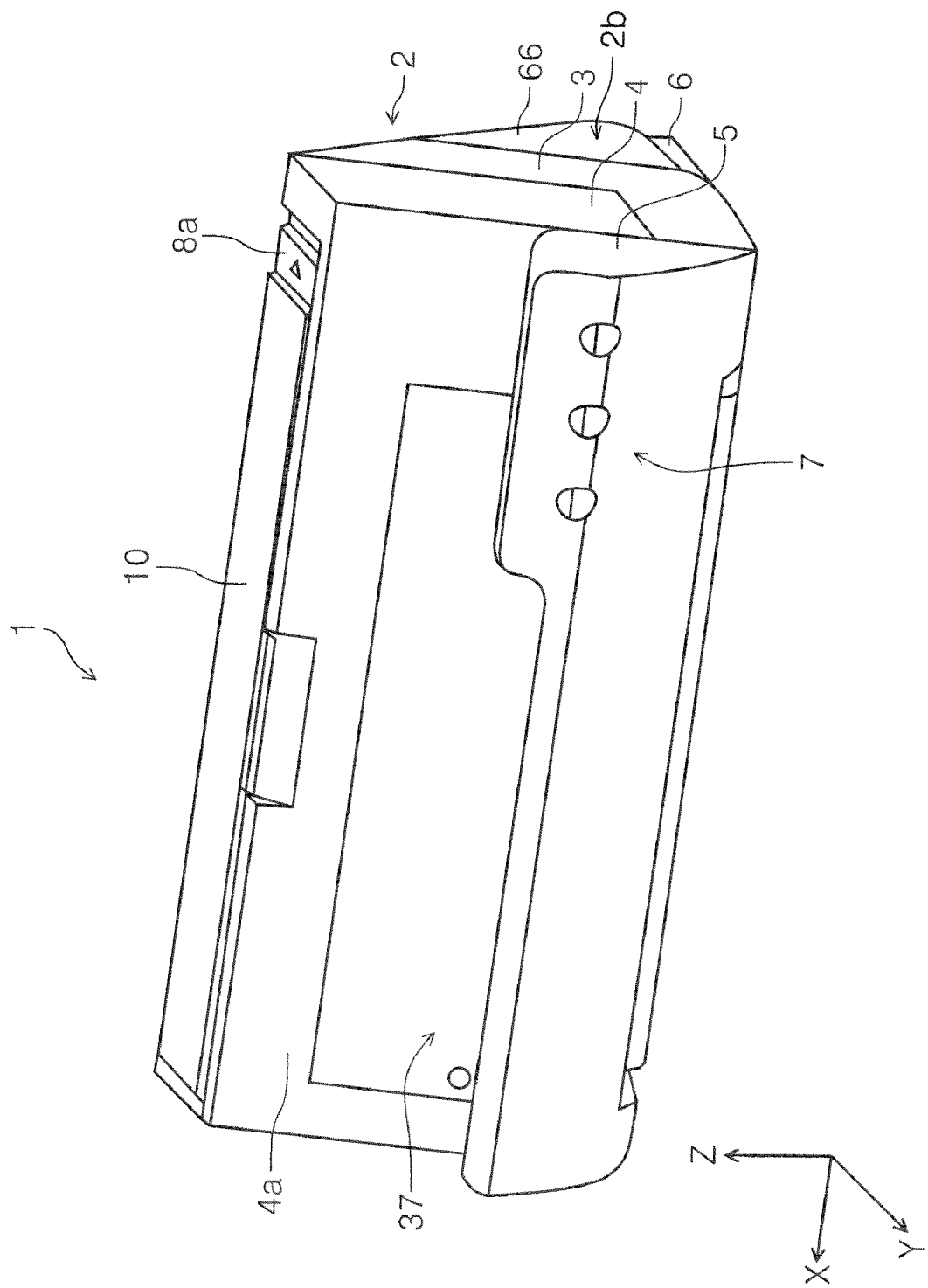
FIG. 1 is a perspective view of a scanner in which an apparatus main body is in a normal reading posture as viewed from the front.

Hereinafter, the present disclosure will be schematically described.

An image reading apparatus according to a first aspect includes: an apparatus main body including a reading portion that reads an image of a document being transported; and a main body supporting portion rotatably supporting the apparatus main body such that the apparatus main body is configured to take a plurality of postures, in which the apparatus main body includes at least one coupling portion to which a coupling target is coupled, and the coupling portion is provided on a side of the apparatus main body, the side intersecting a first direction along a rotation shaft of the apparatus main body.

According to the present aspect, since at least one coupling portion to which the coupling target is coupled in the image reading apparatus is provided on the side of the apparatus main body, intersecting the rotation shaft line direction of the apparatus main body, it is possible to suppress the movement of the cable or the like that is coupled to the coupling portion when the apparatus main body is rotated. As a result, the cables or the like are less likely to get in the way when the apparatus main body is rotated, and it is possible to prevent the cables or the like from hindering the rotation of the apparatus main body.

In a second aspect according to the first aspect, the rotation shaft of the apparatus main body and the at least one coupling portion may overlap with each other, when the apparatus main body is in at least one posture among the plurality of postures and is viewed from the rotation shaft line direction.

According to the present aspect, since the rotation shaft of the apparatus main body rotates and the at least one coupling portion overlap each other when viewed from the rotation shaft line direction that is the first direction, the positions of the rotation center of the apparatus main body and the at least one coupling portion become close to each other. As a result, it is possible to further suppress the movement of the cable or the like that is coupled to the coupling portion when the apparatus main body is rotated.

A third aspect according to the first aspect may further include: a motor that is a power source for rotation of the apparatus main body; and a rotation converting section converting rotation of the motor into the rotation of the apparatus main body.

According to the present aspect, it is not necessary for the user to directly rotate the apparatus main body and the usability of the user is improved by providing the motor that is a power source for the rotation of the apparatus main body and the rotation converting section that converts the rotation of the motor into the rotation of the apparatus main body.

In a fourth aspect according to the third aspect, the motor may be provided in the apparatus main body, the rotation converting section may include a toothed wheel that is a toothed wheel rotatably provided in the apparatus main body and is rotated by power of the motor, and a toothed portion that is a toothed portion fixed to the main body supporting portion and that meshes with the toothed wheel, and the toothed portion may be formed at a vertical wall portion that rises from the main body supporting portion, and may include a part where the vertical wall portion and the at least one coupling portion overlap with each other in a state in which the apparatus main body is in at least one posture among the plurality of postures when viewed from the first direction.

According to the present aspect, since the part where the vertical wall portion and the at least one coupling portion overlap each other when viewed from the rotation shaft line direction is provided, the positions of the rotation center of the apparatus main body and the at least one coupling portion become close to each other. As a result, it is possible to further suppress the movement of the cable or the like that is coupled to the coupling portion when the apparatus main body is rotated.

In a fifth aspect according to the first aspect, the at least one coupling portion may be positioned above a rotation shaft in a vertical direction.

According to the present aspect, since the at least one coupling portion is positioned above the rotation shaft in the vertical direction regardless of the posture of the apparatus main body, when the coupling target, which is coupled to the coupling portion, is a cable in particular, it is possible to more reliably prevent the cable from coming into contact with the placement surface of the apparatus and hindering the rotation of the apparatus main body when the apparatus main body is rotated.

In a sixth aspect according to the fifth aspect, the at least one coupling portion may comprise at least two coupling portions, the at least two coupling portions may include a first coupling portion and a second coupling portion, and the first coupling portion and the second coupling portion may be positioned above the rotation shaft in the vertical direction.

According to the present aspect, the first coupling portion and the second coupling portion are positioned above the rotation shaft in the vertical direction regardless of the posture of the apparatus main body, and thereby the effect of the fifth aspect described above can be obtained in the configuration including the first coupling portion and the second coupling portion.

In a seventh aspect according to the sixth aspect, the plurality of postures of the apparatus main body may include a first posture in which an angle formed by a read transporting path, which faces the reading portion, with a placement surface of the main body supporting portion is an first angle, and a second posture in which the angle is smaller than the first angle, the second coupling portion may be positioned vertically above the first coupling portion when the apparatus main body is in the first posture and in the second posture, a circuit substrate including the first coupling portion and the second coupling portion may be provided in a posture in which a substrate surface is along the read transporting path or in a posture in which the substrate surface stands such that the substrate surface forms an acute angle with the read transporting path, on an apparatus back surface side with respect to the read transporting path, and a dimension of the second coupling portion in a thickness direction of the circuit substrate may be smaller than a dimension of the first coupling portion in the thickness direction.

According to the present aspect, since the circuit substrate is provided in a posture in which the substrate surface is along the read transporting path or in a posture in which the substrate surface stands such that the substrate surface forms an acute angle with the read transporting path, on the apparatus back surface side with respect to the read transporting path, when explaining on the premise of the first posture of the apparatus main body, the space on the back surface side of the read transporting path decreases upward.

In such a configuration, since the second coupling portion, which is positioned vertically above the first coupling portion, has the dimension in the thickness direction of the circuit substrate smaller than the dimension in the thickness direction of the first coupling portion, the first coupling portion and the second coupling portion are disposed as the space on the back surface side of the read transporting path decreases upward, thereby it is possible to suppress the increase in size of the apparatus by efficiently disposing components.

The above-mentioned effects will be described in detail later with reference to the drawings.

In an eighth aspect according to the seventh aspect, the plurality of coupling portions may include a third coupling portion positioned vertically below the second coupling portion when the apparatus main body is in the first posture and in the second posture, the first coupling portion, the second coupling portion, and the third coupling portion may be provided on the circuit substrate, and a dimension of the third coupling portion in the thickness direction of the circuit substrate may be larger than the dimension of the second coupling portion in the thickness direction.

According to the present aspect, since the third coupling portion, which is positioned vertically below the second coupling portion, has the dimension in the thickness direction of the circuit substrate larger than the dimension in the thickness direction of the second coupling portion, the third coupling portion is disposed as the space on the back surface side of the read transporting path increases downward, thereby it is possible to suppress the increase in size of the apparatus by efficiently disposing components.

The above-mentioned effects will be described in detail later with reference to the drawings.

In a ninth aspect according to the eighth aspect, the first coupling portion may be a coupling portion compliant with a USB Type-A, the second coupling portion may be a coupling portion compliant with a USB Type-C, and the third coupling portion may be a coupling portion for supplying electric power to the apparatus main body.

According to the present aspect, in the configuration in which the first coupling portion is a coupling portion compliant with a USB Type-A, the second coupling portion is a coupling portion compliant with a USB Type-C, and the third coupling portion is a coupling portion for supplying electric power to the apparatus main body, the effect of the eighth aspect described above can be obtained. USB is an abbreviation for Universal Serial Bus, and Type-A and Type-C are one of a plurality of types defined in the USB standard, respectively.

In a tenth aspect according to any one of the first to ninth aspects, the apparatus main body may include a transporting section that transports a document, and a transporting motor that drives the transporting section, and the transporting motor may be provided closer to a side surface opposite to the side surface where the coupling portion is provided.

According to the present aspect, since the motor is provided closer to the side surface opposite to the side surface where the coupling portion is provided, it is possible to suppress the increase in size of the apparatus by separately disposing the motor and the coupling portion from each other.

Hereinafter, the present disclosure will be specifically described.

In the following, as an example of the image reading apparatus, a scanner 1 will be taken as an example, which is capable of reading at least one side between a first side of a document and a second side that is opposite to the first side. The scanner 1 is a so-called sheet feed type scanner that reads the document while moving the document with respect to a reading portion described later.

In the present specification, the document includes not only a document having a sheet shape but also a document having a card shape or a document having a booklet shape.

In the X-Y-Z coordinate system illustrated in each figure, the X axis direction is an apparatus width direction and also a document width direction. The Y axis direction is an apparatus depth direction, and the Z axis direction is a direction along the vertical direction.

In the present embodiment, the +Y direction is defined as a direction from a back surface toward a front surface of the apparatus, and the –Y direction is defined as a direction from the front surface toward the back surface of the apparatus. When viewed from the front surface of the apparatus, the left direction is defined as the +X direction, and the right direction is defined as the –X direction.

In the following, a direction in which the document is transported may be referred to as "downstream", and a direction opposite thereto may be referred to as "upstream".

Figure 2:
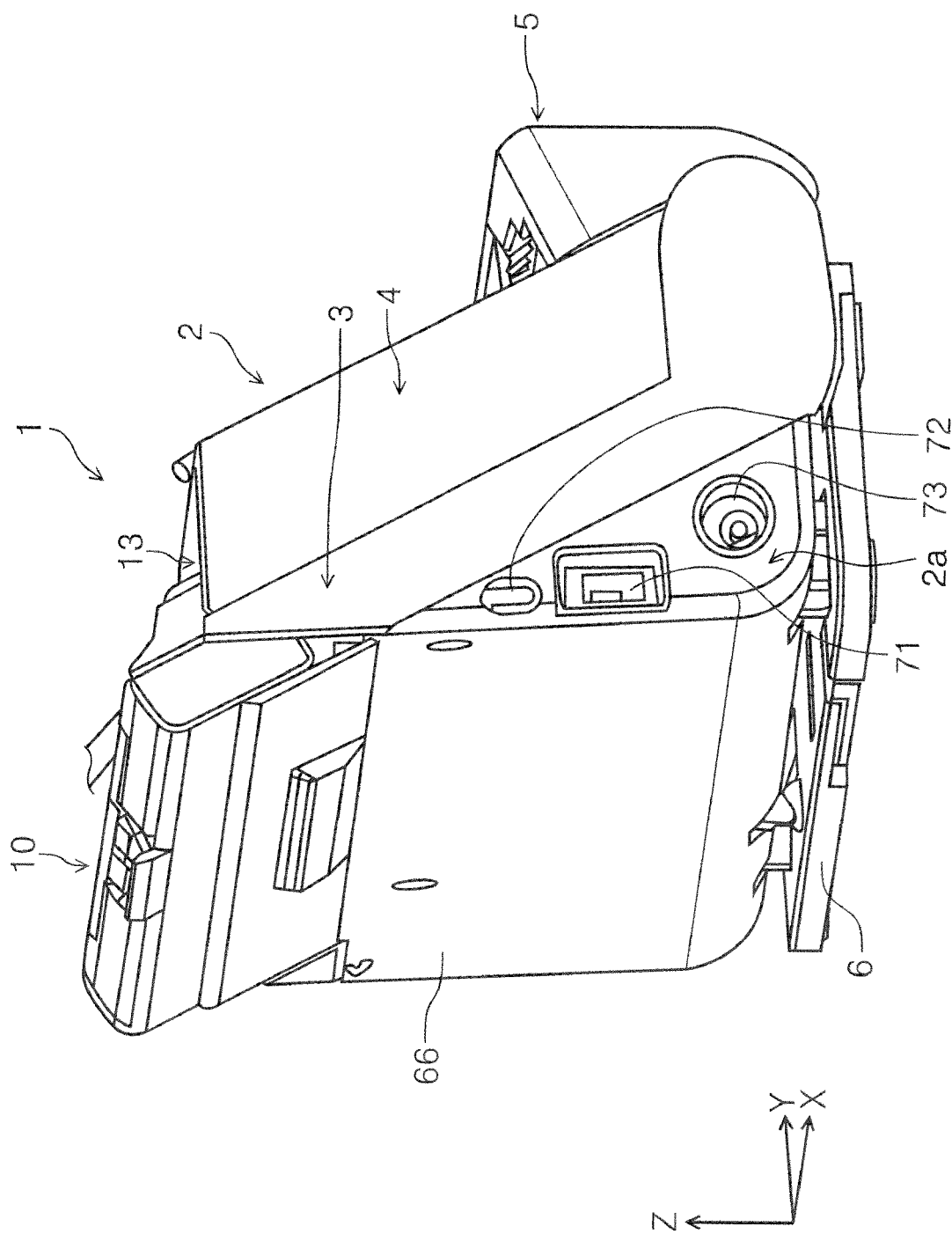
FIG. 2 is a perspective view of the scanner in which the apparatus main body is in the normal reading posture as viewed from the rear.

In FIGS. 1 and 2, the scanner 1 includes the apparatus main body 2 and a main body supporting portion 6 that rotatably supports the apparatus main body 2.

The apparatus main body 2 includes a first unit 3, a second unit 4, and a third unit 5. In the first unit 3, a substrate is configured with a first frame 63 (see FIG. 4). In the second unit 4, a substrate is configured with a second frame 64 (see FIG. 4). In the third unit 5, a substrate is configured with a third frame 65 (see FIG. 3).

Figure 3:
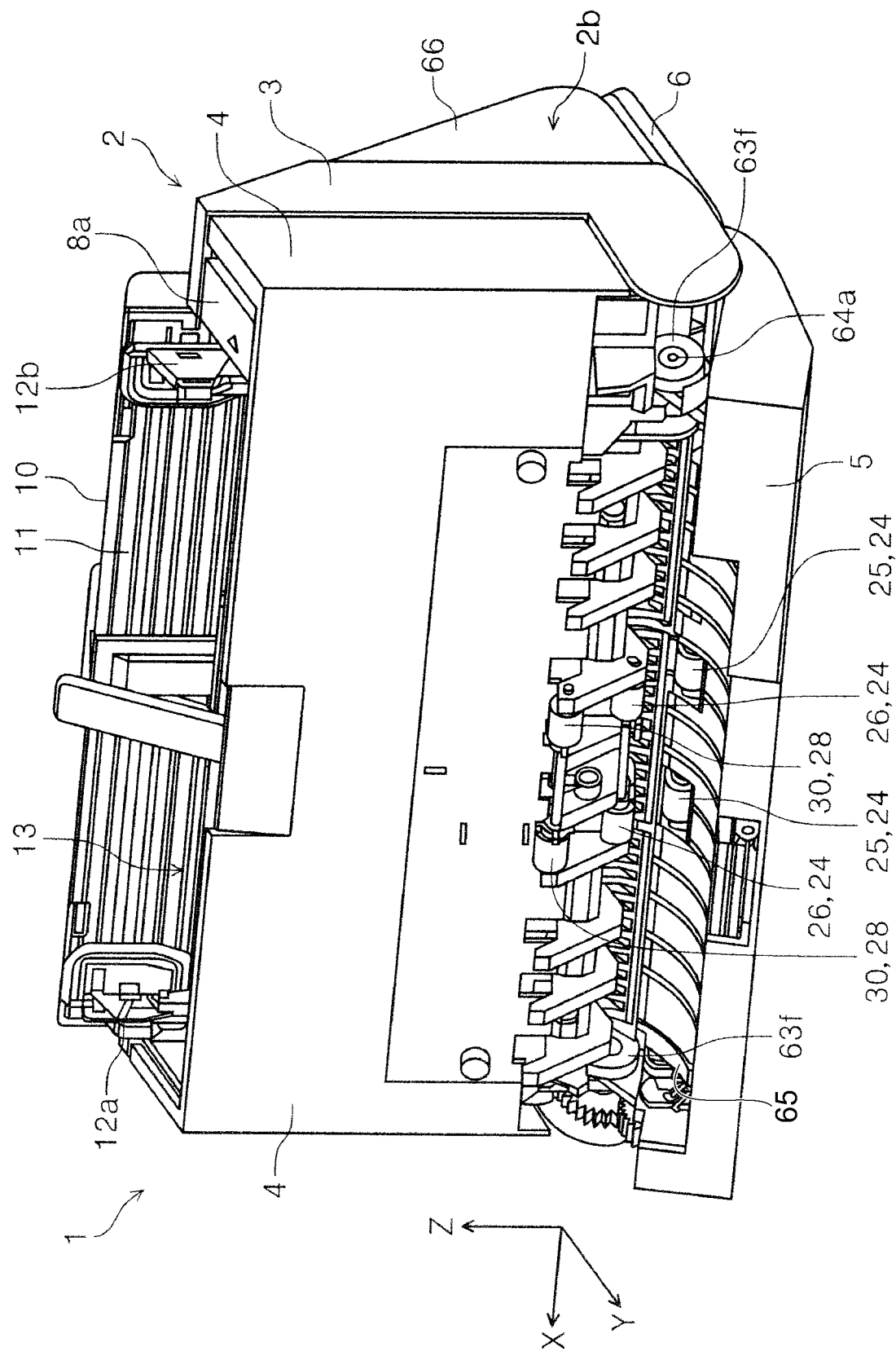
FIG. 3 is a perspective view of the scanner, in which the apparatus main body is in the normal reading posture and a third unit is opened, as viewed from the front.

In FIG. 3, the second unit 4 and the third unit 5 are rotatably provided around a frame rotation shaft 64*a* formed at the second frame 64. The frame rotation shaft 64*a* is a rotation shaft forming a center of the rotation shaft that is parallel to the X axis direction.

The frame rotation shaft 64*a* fits into a bearing portion 63*f* formed at the first frame 63. A bearing portion 65*a* is formed in the third frame 65, and the frame rotation shaft 64*a* fits into the bearing portion 65*a*.

Figure 4:
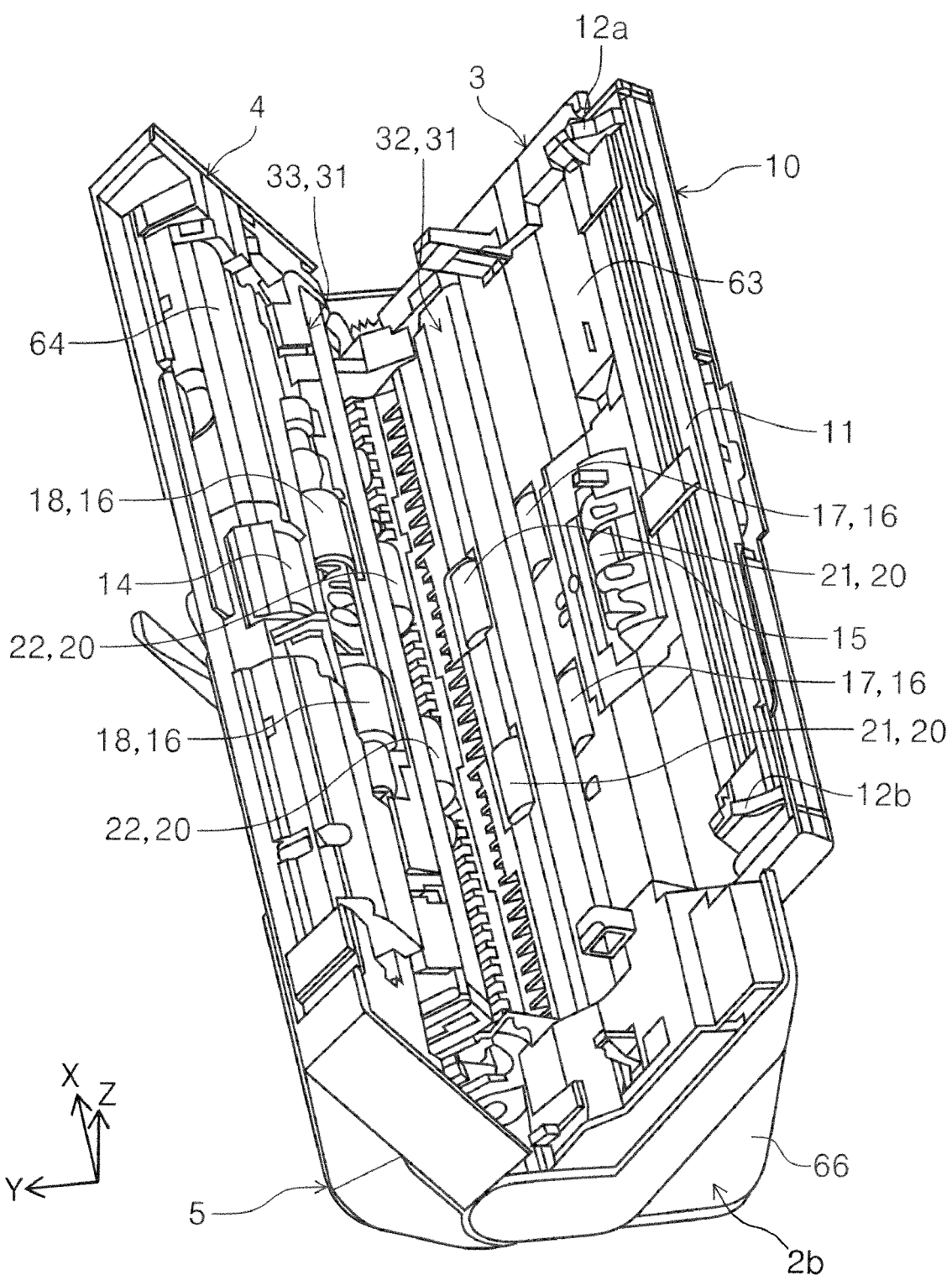
FIG. 4 is a perspective view of the scanner, in which the apparatus main body is in the normal reading posture and a second unit is opened, as viewed from the above.

As a result, the second unit 4 and the third unit 5 can integrally rotate around the frame rotation shaft 64*a* with respect to the first unit 3 (see FIG. 4).

By rotating the second unit 4 and the third unit 5 with respect to the first unit 3, a part of a document transporting path can be exposed as illustrated in FIG. 4. Particularly, a document feeding path R1 and a read transporting path R2, which will be described later, can be exposed. The second unit 4 is maintained in a closed state with respect to the first unit 3 by a locking section (not illustrated), and a user unlocks the locking section by sliding an unlocking portion 8*a* in the –X direction, and can open the second unit 4 as illustrated in FIG. 4.

The third unit 5 can rotate around the frame rotation shaft 64*a* with respect to the first unit 3 and the second unit 4 (see FIG. 3). By rotating the third unit 5 with respect to the first unit 3 and the second unit 4, a part of the document transporting path can be exposed as illustrated in FIG. 3. Particularly, an inversion transporting path R3, which will be described later, can be exposed.

The third unit 5 is capable of being maintained in a closed state (see FIGS. 1 and 2) with respect to the second unit 4 by the locking section (not illustrated), and the user can open the third unit 5 as illustrated in FIG. 3 by applying an external force to the third unit 5 in the opening direction.

Figure 5:
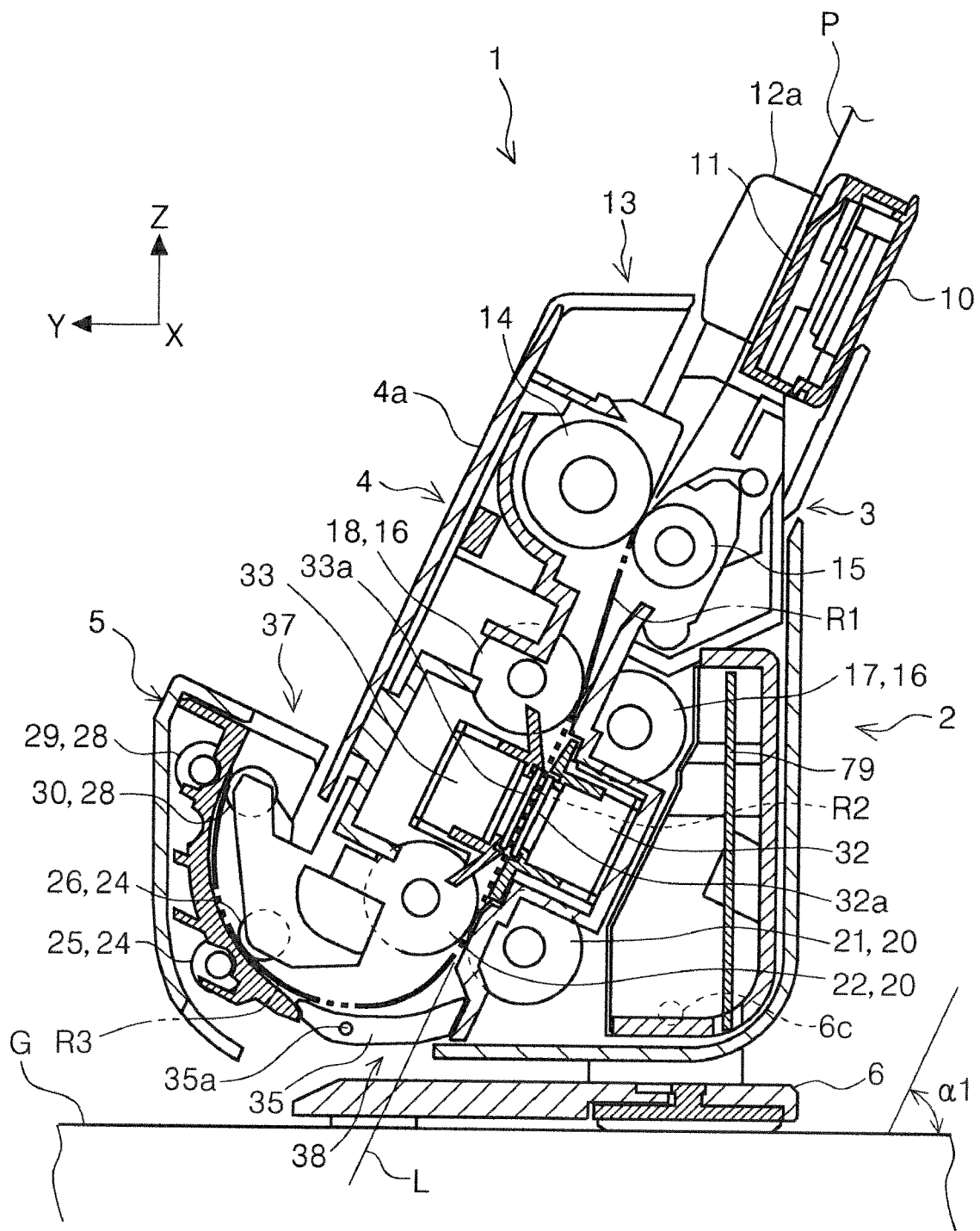
FIG. 5 is a cross-sectional view of a document transporting path of the scanner in which the apparatus main body is in the normal reading posture as viewed from the width direction.
Figure 6:
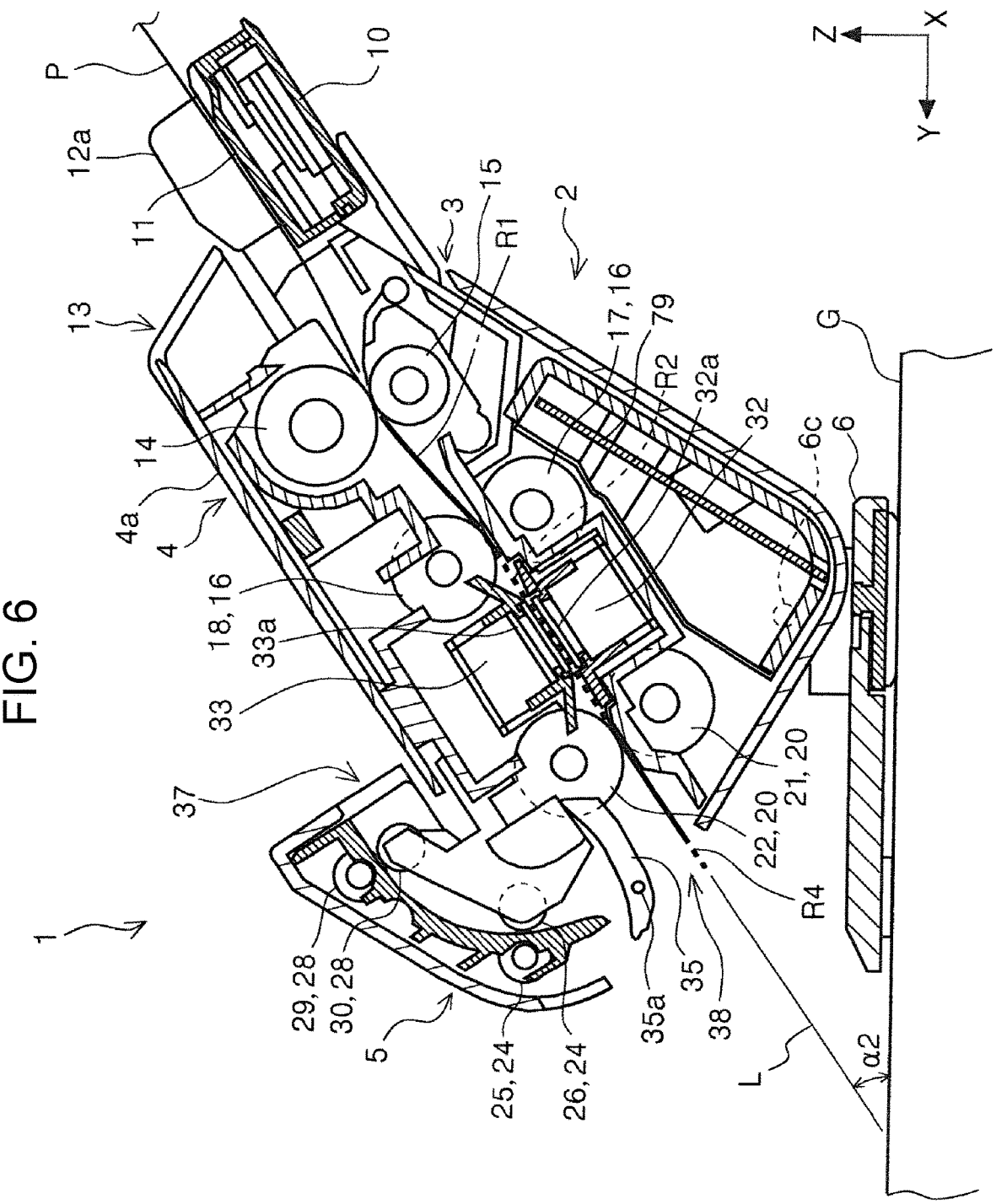
FIG. 6 is a cross-sectional view of the document transporting path of the scanner in which the apparatus main body is in a booklet reading posture as viewed from the width direction.

The apparatus main body 2 is rotatable around the main body rotation shaft 6*c* with respect to the main body supporting portion 6 (see FIGS. 5 to 10), and in the present embodiment, the apparatus main body 2 can take two postures by the rotation of the apparatus main body 2. The two postures of the apparatus main body 2 are illustrated in FIGS. 5 and 6, and hereinafter, the posture in FIG. 5 is referred to as a normal reading posture, and the posture in FIG. 6 is referred to as a booklet reading posture. The normal reading posture is an example of a first posture of the apparatus main body 2, and the booklet reading posture is an example of a second posture of the apparatus main body 2.

An angle α1 illustrated in FIG. 5 and an angle α2 illustrated in FIG. 6 are angles formed by the read transporting path R2 and a placement surface G of the apparatus, described later respectively. The angle α2 in the case of the booklet reading posture is smaller than the angle α1 in the case of the normal reading posture.

In the normal reading posture, a projected area of the apparatus main body 2 on the placement surface G on which the scanner 1 is placed is the smallest, that is, a footprint of the apparatus main body 2 is the smallest.

The footprint in the present specification is an occupied area of the apparatus main body 2 in the X-Y plane when the apparatus main body 2 is viewed from the above.

The normal reading posture is suitable for reading a document having a sheet shape, that is, a document having low rigidity and easy bending. The booklet reading posture is suitable for reading a document having high rigidity and hard bending such as a plastic card or a booklet.

An operation portion 7 that is configured with a plurality of operation buttons including a power button is provided on the front surface of the apparatus.

As illustrated in FIG. 2, a first coupling portion 71, a second coupling portion 72, and a third coupling portion 73 are provided on the side surface 2a among the side surfaces configuring the periphery of the apparatus in the +X direction.

In the present embodiment, each coupling portion is a coupling portion to which any one of a USB Type-A plug, a USB Type-B plug, a USB Type-C plug, and a power plug is coupled.

USB is an abbreviation for Universal Serial Bus, and Type-A, Type-B, and Type-C are one of a plurality of types defined in the USB standard, respectively.

Figure 12:
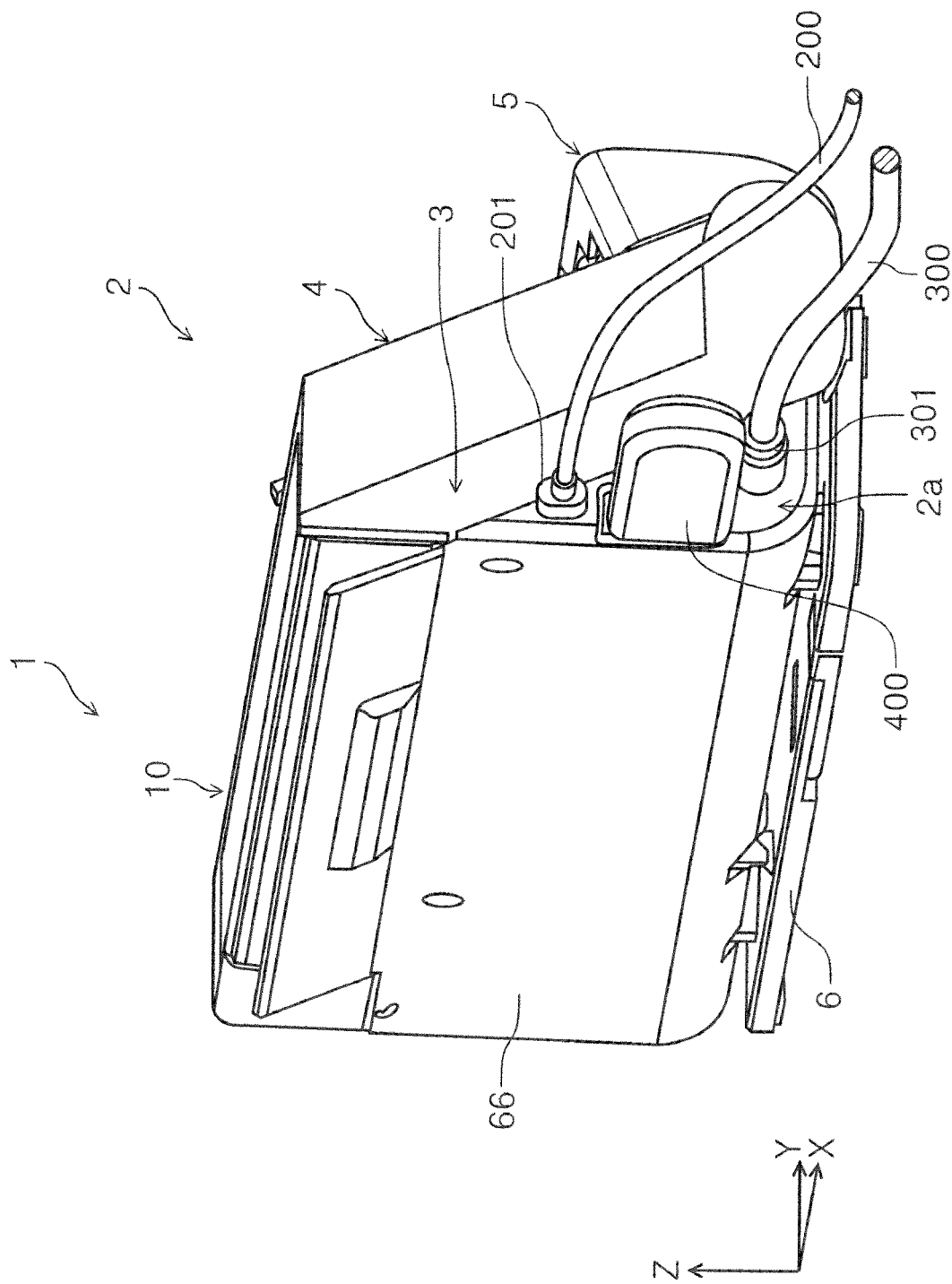
FIG. 12 is a perspective view of the scanner in which the apparatus main body is in the normal reading posture as viewed from the rear.

In the present embodiment, the first coupling portion 71 is a part to which the USB Type-A plug is coupled. An external apparatus such as a computer (not illustrated) or a card reader (not illustrated) can be coupled to the first coupling portion 71 via a USB cable (not illustrated), and a storage medium such as a USB memory 400 as illustrated in FIG. 12 can be coupled. The control portion (not illustrated) of the apparatus can store the read data in the USB memory 400 coupled to the first coupling portion 71.

In the present embodiment, the second coupling portion 72 is a part to which the USB Type-C plug is coupled. As illustrated in FIG. 12, the USB Type-C plug 201 that is provided at one end of the USB cable 200 can be coupled to the second coupling portion 72, and the external apparatus (not illustrated) can be coupled via the USB cable 200.

In the present embodiment, the apparatus main body 2 is configured to be able to receive the electric power from the external apparatus that is coupled to the second coupling portion 72.

The diameter of a USB cable 200 is smaller than the diameter of a power cable 300 described later, which makes the USB cable 200 easier to bend than the power cable 300.

In the present embodiment, the third coupling portion 73 is a part to which a DC jack for supplying electric power to the apparatus main body 2 is coupled. As illustrated in FIG. 12, the DC jack 301 that is provided at one end of the power cable 300 can be coupled to the third coupling portion 73.

Figure 11:
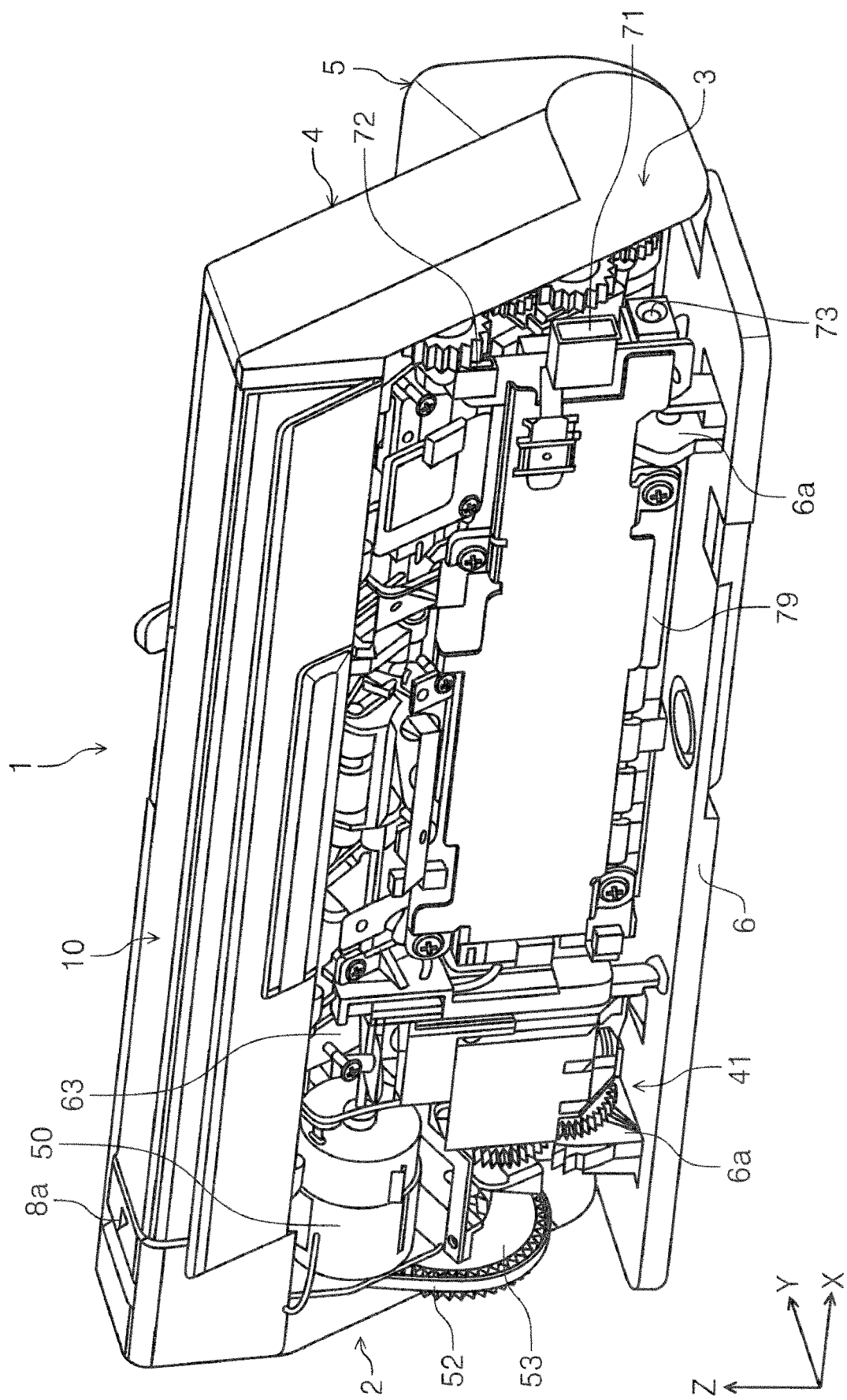
FIG. 11 is a perspective view of the scanner in which the back surface cover of the first unit is removed as viewed from the rear.

The first coupling portion 71, the second coupling portion 72, and the third coupling portion 73 are mounted on a circuit substrate 79 (see FIGS. 7 and 11) positioned on an apparatus back surface side and are provided so as to be exposed on the side surface 2a of the apparatus main body 2 in the +X direction as illustrated in FIG. 2.

In the present specification, a coupling target, which is coupled to the coupling portion, is used in a broad sense including not only a plug that is a part directly coupled to the coupling portion, but also a cable to which the plug is attached or a component part provided with the plug. For example, the USB Type-A plug (not illustrated) included in the USB memory 400 illustrated in FIG. 12 is an example of the coupling target coupled to the first coupling portion 71, and a main body of the USB memory 400 is also the coupling target coupled to the first coupling portion 71 via the USB Type-A plug (not illustrated).

The plug 201 is an example of the coupling target coupled to the second coupling portion 72, and the USB cable 200 is also the coupling target coupled to the second coupling portion 72 via the plug 201.

Further, the DC jack 301 is an example of the coupling target coupled to the third coupling portion, and the power cable 300 is also the coupling target coupled to the third coupling portion 73 via the DC jack 301.

Subsequently, the configuration of the document transporting path in the scanner 1 will be described with reference to FIGS. 5 and 6. The fed document is supported in an inclined posture by the document supporting portion 11. A reference numeral P indicates the supported document.

When a plurality of documents is supported by the document supporting portion 11, the highest-level document is fed downstream by a feeding roller 14. The document supporting portion 11 is formed in an upper opening/closing portion 10. The upper opening/closing portion 10 is rotatable around a rotation shaft (not illustrated), and a feeding port 13 is opened/closed by the rotation of the upper opening/closing portion 10. FIG. 1 illustrates a state in which the upper opening/closing portion 10 is closed, and FIG. 2 illustrates a state in which the upper opening/closing portion 10 is opened. The upper opening/closing portion 10 configures the first unit 3.

As illustrated in FIG. 3, the document supporting portion 11 is provided with a pair of edge guides 12a and 12b that guides the side edges of the document. The pair of edge guides 12a and 12b is provided so as to be slidable in the document width direction (the X axis direction). The pair of edge guides 12a and 12b is provided so as to be in conjunction with a rack and pinion mechanism (not illustrated) such that the pair of edge guides 12a and 12b is separated from each other or close to each other with the center position in the document width direction interposed therebetween. That is, the scanner 1 adopts a so-called center feeding method.

Returning to FIGS. 5 and 6, the feeding roller 14 is provided in the second unit 4. The feeding roller 14 rotates by receiving power from a transporting motor 50 described later. A separation roller 15 is provided at a position facing the feeding roller 14 in the first unit 3. Rotational torque is applied to the separation roller 15 by a torque limiter (not illustrated), thereby the double feeding of the documents is suppressed.

The feeding roller 14 and the separation roller 15 are provided at the center position in the document width direction (see FIG. 4).

A separation pad may be provided instead of the separation roller 15.

Further, in the present embodiment, the feeding roller 14 is provided on the upper side of the documents placed on the document supporting portion 11 and the document is fed from the top document, but the feeding roller 14 may be provided at the lower side of the documents placed on the document supporting portion 11 and the document may be fed from the bottom document.

A pair of first transporting rollers 16, which is an example of a transporting section that transports the documents, is provided downstream of the feeding roller 14 and the separation roller 15. The pair of first transporting rollers 16 is configured with a first lower roller 17 provided in the first unit 3 and a first upper roller 18 provided in the second unit 4. The first upper roller 18 is provided so as to be capable of advancing and retreating with respect to the first lower roller 17 and is pressed toward the first lower roller 17 by a pressing member (not illustrated), for example, a coil spring.

Both the first lower roller 17 and the first upper roller 18 rotate by receiving the power from the transporting motor 50 described later. Two sets of first lower roller 17 and first upper roller 18 are provided so as to interpose the center position in the document width direction, respectively (see FIG. 4).

When the second unit 4 is closed with respect to the first unit 3, the first lower roller 17 and the first upper roller 18 come into contact with each other. When the second unit 4 is opened with respect to the first unit 3, the first upper roller 18 is separated from the first lower roller 17.

A first reading portion 32 and a second reading portion 33 are disposed to face each other downstream of the pair of first transporting rollers 16. The first reading portion 32 is provided in the first unit 3, and the second reading portion 33 is provided in the second unit 4. The first reading portion 32 reads a lower side (the first side) of the document supported by the document supporting portion 11, and the second reading portion 33 reads an upper side (the second side) of the document. The second reading portion 33 is provided so as to be capable of advancing and retreating with respect to the first reading portion 32 and is pressed toward the first reading portion 32 by the pressing member (not illustrated), for example, the coil spring.

In the present embodiment, the first reading portion 32 and the second reading portion 33 are configured with a contact type image sensor module (CISM). A reference numeral 32*a* is a contact glass configuring the first reading portion 32, and reference numeral 33*a* is a contact glass configuring the second reading portion 33.

A pair of second transporting rollers 20, which is an example of a transporting section that transports the documents, is provided downstream of the first reading portion 32 and the second reading portion 33. The pair of second transporting rollers 20 is configured with a second lower roller 21 provided in the first unit 3 and a second upper roller 22 provided in the second unit 4. The second upper roller 22 is provided so as to be capable of advancing and retreating with respect to the second lower roller 21 and is pressed toward the second lower roller 21 by the pressing member (not illustrated), for example, the coil spring.

Both the second lower roller 21 and the second upper roller 22 rotate by receiving the power from the transporting motor 50 described later. Two sets of second lower roller 21 and second upper roller 22 are provided so as to interpose the center position in the document width direction, respectively (see FIG. 4).

When the second unit 4 is closed with respect to the first unit 3, the second lower roller 21 and the second upper roller 22 come into contact with each other. When the second unit 4 is opened with respect to the first unit 3, the second upper roller 22 is separated from the second lower roller 21.

In FIGS. 5 and 6, an alternate long and short dash line indicated by the reference numeral R1 is the document feeding path, and the document feeding path R1 is defined from a nip position between the feeding roller 14 and the separation roller 15 to a nip position between the pair of first transporting rollers 16. Further, in FIGS. 5 and 6, a broken line indicated by the reference numeral R2 is a read transporting path, and the read transporting path R2 is defined from a nip position between the pair of first transporting rollers 16 to a nip position between the pair of second transporting rollers 20. The read transporting path R2 is the document transporting path facing the first reading portion 32 and the second reading portion 33.

When the apparatus main body 2 is in the normal reading posture illustrated in FIG. 5, the inversion transporting path R3, which is used when the read document is inverted upward and ejected, is formed downstream of the read transporting path R2. The inversion transporting path R3 is the document transporting path positioned downstream from the nip position between the pair of second transporting rollers 20, and as illustrated by a two-dot chain line in FIG. 5, is the document transporting path for bending and inverting the document, which is transported in the diagonally downward direction and ejecting the document in the diagonally upward direction from a first ejection port 37.

When the apparatus main body 2 is in the booklet reading posture illustrated in FIG. 6, a non-inversion transporting path R4, which is used when the read document is ejected without being inverted, is formed downstream of the read transporting path R2. The non-inversion transporting path R4 is the document transporting path positioned downstream from the nip position between the pair of second transporting rollers 20, and as illustrated by a two-dot chain line in FIG. 6, is the document transporting path for ejecting the document, which is transported in the diagonally downward direction in the read transporting path R2, in the diagonally downward direction from a second ejection port 38 without bending and inverting.

The pair of second transporting rollers 20 functions as a pair of ejection rollers that ejects the document from the non-inversion transporting path R4.

Switching between the inversion transporting path R3 and the non-inversion transporting path R4 is performed by using a flap 35 as a flap member configuring a transporting path switching section. The flap 35 is rotatable about a flap rotation shaft 35*a*, and by the rotation, the flap 35 couples the inversion transporting path R3 to the read transporting path R2 and couples the non-inversion transporting path R4 to the read transporting path R2. Coupling the inversion transporting path R3 to the read transporting path R2 means to make the inversion transporting path R3 a usable state, or to make the non-inversion transporting path R4 an unusable state. Similarly, coupling the non-inversion transporting path R4 to the read transporting path R2 means to make the non-inversion transporting path R4 a usable state, or to make the inversion transporting path R3 an unusable state.

In the present embodiment, the flap 35 is configured to be rotated in conjunction with the posture switching of the apparatus main body 2. In the present embodiment, a solenoid (not illustrated) is adopted as a configuration in which the flap 35 is rotated in conjunction with the posture switching of the apparatus main body 2. The control portion (not illustrated), which performs various controls, detects the posture of the apparatus main body 2 based on a detection signal of a first posture detection sensor 87 or a second posture detection sensor (not illustrated) described later, and rotates the flap 35 by driving the solenoid based on the detection. The method for rotating the flap 35 is not limited to the solenoid but may be another actuator such as a motor. Alternatively, the flap 35 may be configured to be rotated mechanically in conjunction with the posture of the apparatus main body 2.

The inversion transporting path R3 is provided with a pair of third transporting rollers 24 and a pair of fourth transporting rollers 28.

The pair of third transporting rollers 24 is configured with a third driving roller 25 provided in the third unit 5 and a third driven roller 26 provided in the second unit 4. The third driven roller 26 is provided so as to be capable of advancing and retreating with respect to the third driving roller 25 and is pressed toward the third driving roller 25 by the pressing member (not illustrated), for example, the coil spring. The third driving roller 25 is driven by the transporting motor 50. The third driven roller 26 is a roller that is driven to rotate.

The pair of fourth transporting rollers 28 is configured with a fourth driving roller 29 provided in the third unit 5 and a fourth driven roller 30 provided in the second unit 4. The fourth driven roller 30 is provided so as to be capable of advancing and retreating with respect to the fourth driving roller 29 and is pressed toward the fourth driving roller 29 by the pressing member (not illustrated), for example, the coil spring. The fourth driving roller 29 is driven by the transporting motor 50. The fourth driven roller 30 is a roller that is driven to rotate.

Two sets of third driving roller 25, the third driven roller 26, the fourth driving roller 29, and the fourth driven roller 30 are provided so as to interpose the center position in the document width direction, respectively (see FIG. 3).

When the third unit 5 is closed with respect to the second unit 4, the third driving roller 25 and the third driven roller 26 come into contact with each other, and the fourth driving roller 29 and the fourth driven roller 30 also come into contact with each other. When the third unit 5 is opened with respect to the second unit 4, the third driving roller 25 and the third driven roller 26 are separated from each other, and the fourth driving roller 29 and the fourth driven roller 30 are also separated from each other.

The document, which is transported on the inversion transporting path R3, is ejected diagonally upward including the −Y direction component by the pair of fourth transporting rollers 28 and is supported in an inclined posture by an upper surface 4a of the second unit 4.

Next, a configuration for rotating the apparatus main body 2 will be described. In the present embodiment, the apparatus main body 2 rotates by using the power of the posture switching motor 40 (see FIGS. 7 to 10) under the control of the control portion (not illustrated) and switches the posture. As an example, the control portion (not illustrated) switches the posture of the apparatus main body 2 based on the document reading instruction received from the external apparatus (not illustrated) such as a computer. In the external apparatus, the type of the document to be read can be set. The posture of the apparatus main body 2 is set to the booklet reading posture when the type of the document to be read is a document having a card shape or a document having a booklet shape, and the posture of the apparatus main body 2 is set to the normal reading posture when the type of the document to be read is a document having a sheet shape.

Figure 7:
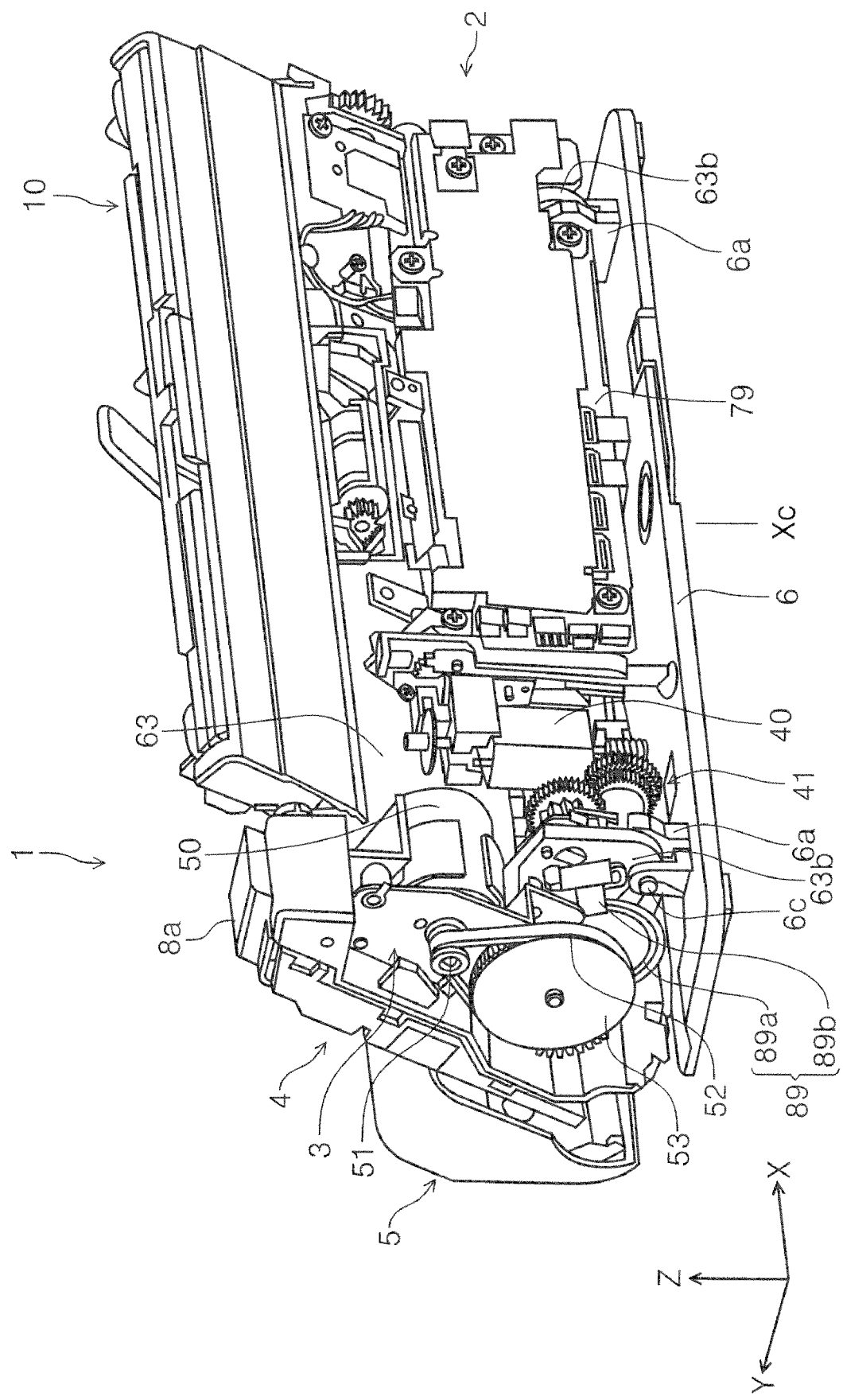
FIG. 7 is a perspective view of the scanner in which a back surface cover of a first unit is removed as viewed from the rear.

FIG. 7 illustrates a state in which a back surface cover 66 (see FIG. 2) configuring the external appearance of the back surface of the apparatus is removed. The reference numeral 41 indicates a rotation converting section for converting the rotation of the posture switching motor 40 into the rotation of the apparatus main body 2. The posture switching motor 40 and the rotation converting section 41 are provided closer to the side surface in the −X direction in the apparatus width direction. In the apparatus width direction, closer to the side surface in the −X direction means that the posture switching motor 40 and the rotation converting section 41 are positioned in the −X direction from the apparatus center position in the X axis direction.

A first frame 63 configuring a substrate of the first unit 3 is provided with two support target portions 63b at intervals in the X axis direction. The main body supporting portion 6 is provided with two main body rotation shafts 6c at intervals in the X axis direction. The first frame 63, that is, the apparatus main body 2, is rotatable about the main body rotation shaft 6c by the main body rotation shaft 6c passing through the support target portion 63b. The main body rotation shaft 6c is a rotation shaft forming the center of the rotation shaft parallel to the X axis direction.

The posture switching motor 40 is provided in the first frame 63. The posture switching motor 40 is provided on the back surface side of the first frame 63 that is provided in the inclined posture.

Figure 8:
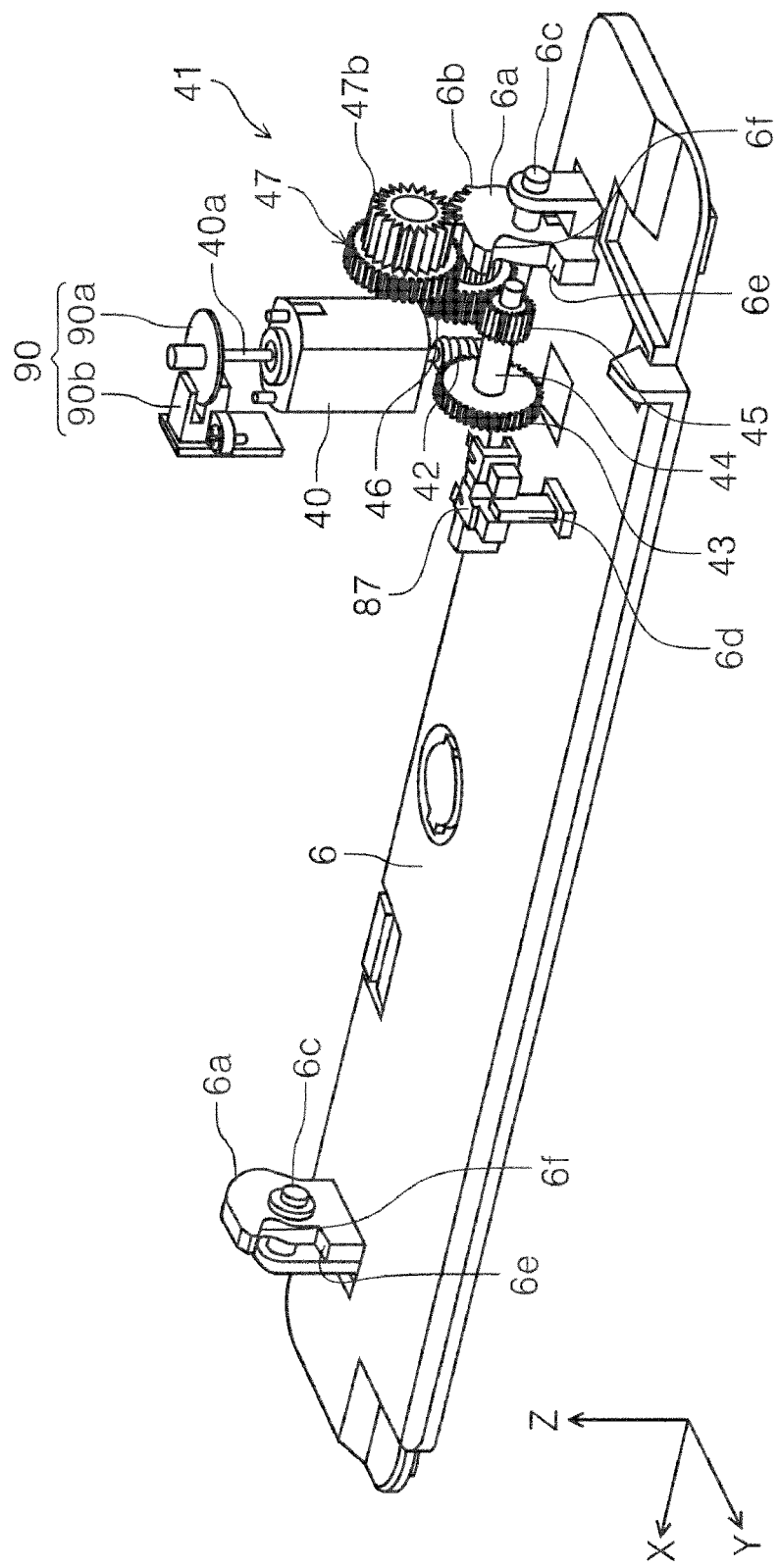
FIG. 8 is a perspective view illustrating a configuration of a posture switching motor and a rotation converting section.

In FIG. 8, the rotation converting section 41 has a toothed wheel 47b that is a toothed wheel rotatably provided in the first unit 3 and that rotates by the power of the posture switching motor 40, and a toothed portion 6b that is a toothed portion fixed to the main body supporting portion 6 and that meshes with the toothed wheel 47b.

The toothed portion 6b is a toothed portion formed around the main body rotation shaft 6c in a vertical wall portion 6a. The vertical wall portion 6a is a member configuring the main body supporting portion 6.

More specifically, a worm gear 42 is provided on a rotation shaft of the posture switching motor 40, and power is transmitted from the worm gear 42 to the toothed wheel 43. The toothed wheel 43 is integrally configured with the toothed wheel 45 via a shaft 44. The toothed wheel 45 transmits the power to a first compound toothed wheel 46, and the first compound toothed wheel 46 transmits the power to a second compound toothed wheel 47. The toothed wheel 47b configures a part of the second compound toothed wheel 47.

A configuration excluding the toothed portion 6b, among the configurations of the posture switching motor 40 and the rotation converting section 41 described above, is provided in the first unit 3, that is, the apparatus main body 2. Therefore, when the toothed wheel 47b rotates by the power of the posture switching motor 40, the apparatus main body 2 rotates as indicated by the change from FIG. 9 to FIG. 10 or the change from FIG. 10 to FIG. 9, and the posture is switched.

In the present embodiment, the configuration excluding the toothed portion 6b, among the configurations of the posture switching motor 40 and the rotation converting section 41 described above, is provided in the first unit 3, that is, the apparatus main body 2, and the toothed portion 6b is provided in the main body supporting portion 6, but instead of the above disposition, the configuration excluding the toothed portion 6b, among the configurations of the posture switching motor 40 and the rotation converting section 41 described above, may be provided in the main body supporting portion 6, and the toothed portion 6b may be provided in the apparatus main body 2.

The vertical wall portion 6a is formed with a first contact portion 6e as a first rotation regulating section and a second contact portion 6f as a second rotation regulating section. A boss 63a, that is provided on the first frame 63, is inserted between the first contact portion 6e and the second contact portion 6f. When the apparatus main body 2 rotates from the booklet reading posture illustrated in FIG. 10 toward the normal reading posture illustrated in FIG. 9, the boss 63a comes into contact with the first contact portion 6e, and then the normal reading posture of the apparatus main body 2 is defined. Further, when the apparatus main body 2 rotates from the normal reading posture illustrated in FIG. 9 toward the booklet reading posture illustrated in FIG. 10, the boss 63a comes into contact with the second contact portion 6f, and then the booklet reading posture of the apparatus main body 2 is defined.

When the boss 63a comes into contact with the first contact portion 6e, or when the boss 63a comes into contact with the second contact portion 6f, a drive current value of the posture switching motor 40 increases. Therefore, the control portion (not illustrated) can detect the posture of the apparatus main body 2 based on the rotational direction and the increased drive current value of the posture switching motor 40. In the present embodiment, a first posture detection sensor 87 and a second posture detection sensor (not illustrated), which will be described later, are provided, and the control portion (not illustrated) can also detect the posture of the apparatus main body 2 based on detection signals of these sensors.

The normal reading posture and the booklet reading posture of the apparatus main body 2 are maintained by supplying electric power to the stopped posture switching motor 40 and by being in a hold state.

The first posture detection sensor 87 is an optical sensor and is provided on the first frame 63, that is, the apparatus main body 2. When the apparatus main body 2 is in the normal reading posture, a protrusion 6d, which is provided on the main body supporting portion 6, blocks the optical axis of the first posture detection sensor 87 as illustrated in FIG. 8. When the apparatus main body 2 rotates toward the booklet reading posture from the above state, the protrusion 6d is displaced from the optical axis of the first posture detection sensor 87. Although the second posture detection sensor is not illustrated, the second posture detection sensor is an optical sensor like the first posture detection sensor 87 and detects the detection target portion (not illustrated) provided on the flap 35 when the posture of the apparatus main body 2 is switched to the booklet reading posture.

In the above-described embodiment, the posture of the apparatus main body 2 is switched by the power of the posture switching motor 40, but instead of or in addition to this, the user may switch the posture of the apparatus main body 2 by applying a force to the apparatus main body 2.

In FIG. 8, the reference numeral 90 is a second rotation detection portion 90. The second rotation detection portion 90 is a rotary encoder that includes a rotation disk 90a provided on the rotation shaft 40a of the posture switching motor 40 and the detection portion 89b. The control portion (not illustrated) can ascertain the rotational direction and the rotation amount of the posture switching motor 40 by detecting the rotation amount of the posture switching motor 40 by the second rotation detection portion 90.

As described above, the scanner 1 includes the main body supporting portion 6 that is placed on the placement surface G of the apparatus and the apparatus main body 2 that is supported by the main body supporting portion 6. The apparatus main body 2 includes the read transporting path R2 that is the document transporting path for transporting the document and that faces the first reading portion 32 and the second reading portion 33 reading the document, the inversion transporting path R3 that is the document transporting path downstream from the read transporting path R2 and is used when the read document is inverted upward and ejected, and the non-inversion transporting path R4 that is the document transporting path downstream from the read transporting path R2 and is used when the read document is ejected without being inverted. Further, the flap 35 that switches the document transporting path, which is coupled to the read transporting path R2, to either the inversion transporting path R3 or the non-inversion transporting path R4, is included.

The apparatus main body 2 is rotatably attached to the main body supporting portion 6 and is capable of being switched between the normal reading posture that is the first posture (FIG. 5) and the booklet reading posture that is the second posture (FIG. 6) in which an angle formed by the read transporting path R2 and the placement surface G is smaller than that of the normal reading posture, by the rotation of the apparatus main body 2. The flap 35 couples the read transporting path R2 to the inversion transporting path R3 when the apparatus main body 2 takes the normal reading posture and couples the read transporting path R2 to the non-inversion transporting path R4 when the apparatus main body 2 takes the booklet reading posture.

The scanner 1 can satisfactorily transport the document that is hard to bend by using the non-inversion transporting path R4. Examples of the document that is hard to bend include booklets, cards, and the like. The flap 35 couples the read transporting path R2 to the inversion transporting path R3 when the apparatus main body 2 takes the normal reading posture and couples the read transporting path R2 to the non-inversion transporting path R4 when the apparatus main body 2 takes the booklet reading posture. Thereby, an ejection direction of the document can be set to be along the placement surface G, rather than ejecting the document by using the non-inversion transporting path R4 when the normal reading posture is taken. As a result, it is possible to eject the document having a larger size as compared with the embodiment in which the document is ejected by using the non-inversion transporting path R4 when the normal reading posture is taken.

By setting the posture of the apparatus main body 2 in the normal reading posture, the angle that is formed by the read transporting path R2 and the placement surface G can be made larger than that of the booklet reading posture, and the footprint of the apparatus main body 2 can be suppressed.

Subsequently, the disposition of the coupling portion provided on the side surface of the apparatus will be described with reference to FIGS. 2 and 9 to 12.

As described above, the apparatus main body 2 is rotatably supported by the main body supporting portion 6 and can take a plurality of postures by rotation of the apparatus main body 2. The apparatus main body 2 includes at least one coupling portion to which the coupling target is coupled. In the present embodiment, a plurality of coupling portions is provided, and the plurality of coupling portions is configured with a first coupling portion 71, a second coupling portion 72, and a third coupling portion 73 as illustrated in FIG. 2.

These coupling portions are provided on the side surface of the apparatus main body 2 that is on the side surface 2a intersecting a rotation shaft line direction (X axis direction) of the apparatus main body 2. The side surface 2a is a side surface of the apparatus main body 2 in the +X direction.

By disposing each coupling portion in this way, it is possible to suppress the movement of the coupling target coupled to each coupling portion when the apparatus main body 2 is rotated. As a result, the coupling target is less likely to get in the way when the apparatus main body 2 is being rotated, and it is possible to prevent the coupling target from hindering the rotation of the apparatus main body 2.

In the present embodiment, each coupling portion is provided on the side surface of the apparatus main body 2 in the +X direction but may be provided on the side surface in the −X direction. Alternatively, at least one coupling portion may be provided on the side surface in the −X direction, and at least one other coupling portion may be provided on the side surface in the +X direction.

Figure 9:
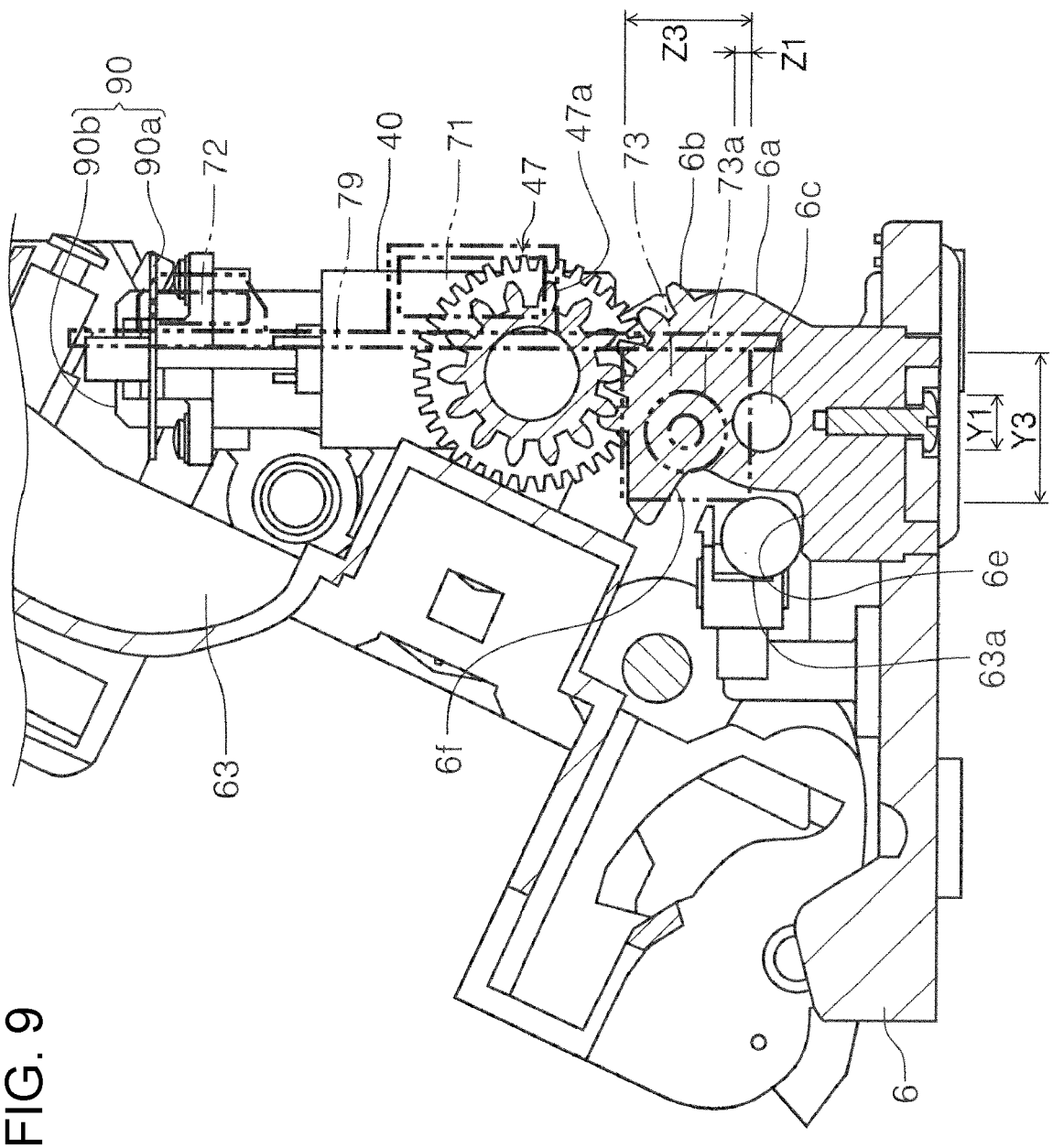
FIG. 9 is a cross-sectional view of configurations of the posture switching motor and the rotation converting section when the apparatus main body is in the normal reading posture as viewed from the width direction.
Figure 10:
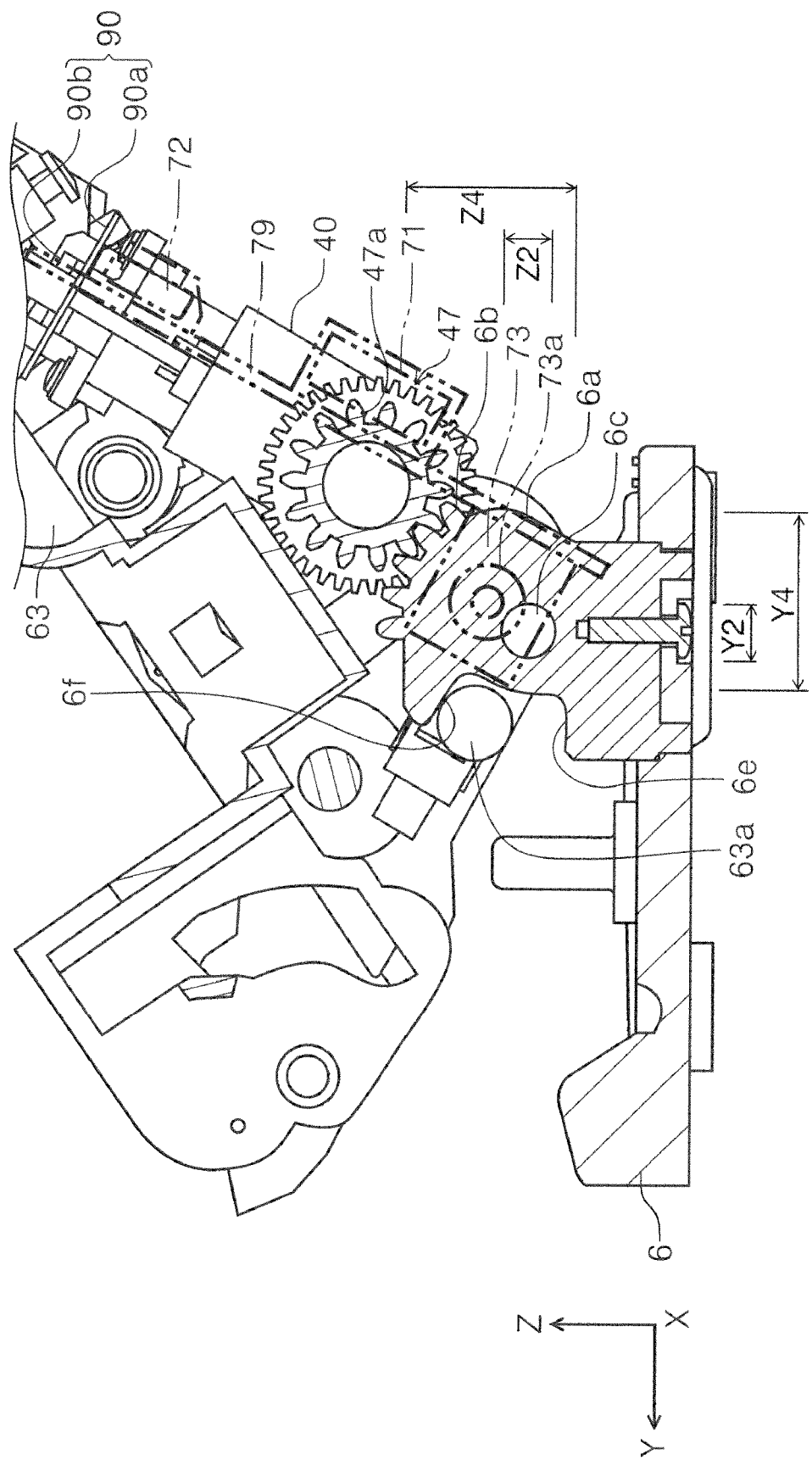
FIG. 10 is a cross-sectional view of configurations of the posture switching motor and the rotation converting section when the apparatus main body is in the booklet reading posture as viewed from the width direction.

In a state in which the apparatus main body 2 is in at least one of the plurality of postures, as viewed from the rotation shaft line direction of the apparatus main body 2 (the X axis direction), a part where the main body rotation shaft 6c that is a rotation shaft when the apparatus main body 2 rotates and at least one coupling portion overlap each other, is included as illustrated in FIGS. 9 and 10. Specifically, in the present embodiment, a part where the main body rotation shaft 6c and the third coupling portion 73 overlap with each other in both the normal reading posture and the booklet reading posture, is included. A range indicated by the reference numeral Z1 in FIG. 9 and a range indicated by the reference numeral Z2 in FIG. 10 are ranges of the part where the main body rotation shaft 6c and the third coupling portion 73 overlap with each other in the Z axis direction.

Further, a range indicated by the reference numeral Y1 in FIG. 9 and a range indicated by the reference numeral Y2 in FIG. 10 are ranges of the part where the main body rotation shaft 6c and the third coupling portion 73 overlap with each other in the Y axis direction.

With such a configuration, the rotation center of the apparatus main body 2 and the position of the third coupling portion 73 are close to each other, and the movement of the DC jack 301 or the power cable 300 can be further suppressed when the apparatus main body 2 is being rotated.

In the present embodiment, the main body rotation shaft 6c and the third coupling portion 73 overlap with each other in both the normal reading posture and the booklet reading posture, but the main body rotation shaft 6c and the third coupling portion 73 may overlap with each other in either the normal reading posture or the booklet reading posture.

In the present embodiment, when viewed from the X axis direction, a part of the third coupling portion 73 excluding an area 73a where the DC jack 301 fits overlaps with the main body rotation shaft 6c, but the area 73a where the DC jack 301 fits may overlap with the main body rotation shaft 6c.

Instead of the third coupling portion 73, another coupling portion may overlap with the main body rotation shaft 6c. For example, the second coupling portion 72 that can receive electric power from the external apparatus may overlap with the main body rotation shaft 6c.

In the present embodiment, the posture switching motor 40 that is a power source for the rotation of the apparatus main body 2 and the rotation converting section 41 that converts the rotation of the posture switching motor 40 into the rotation of the apparatus main body 2 are provided so that it is not necessary for the user to directly rotate the apparatus main body 2, and the usability of the user is improved.

The posture switching motor 40 is provided in the apparatus main body 2, and in the apparatus main body 2 as illustrated in FIGS. 9 and 10, the rotation converting section 41 includes a toothed wheel 47a that is a toothed wheel rotatably provided and that rotates by the power of the posture switching motor 40, and a toothed portion 6b that is a toothed portion fixed to the main body supporting portion 6 and meshes with the toothed wheel 47a. The toothed portion 6b is formed at the vertical wall portion 6a rising from the main body supporting portion 6 and includes a part where the vertical wall portion 6a and the third coupling portion 73 overlap with each other when viewed from the X axis direction in a state in which the apparatus main body 2 is in at least one posture among a plurality of postures. In the present embodiment, the vertical wall portion 6a and the third coupling portion 73 overlap with each other when viewed from the X axis direction in both the normal reading posture (FIG. 9) and the booklet reading posture (FIG. 10).

A range indicated by the reference numeral Z3 in FIG. 9 and a range indicated by the reference numeral Z4 in FIG. 10 are ranges of the part where the vertical wall portion 6a and the third coupling portion 73 overlap with each other in the Z axis direction. A range indicated by the reference numeral Y3 in FIG. 9 and a range indicated by the reference numeral Y4 in FIG. 10 are ranges of the part where the vertical wall portion 6a and the third coupling portion 73 overlap with each other in the Y axis direction.

As a result, the rotation center of the apparatus main body 2 and the position of the third coupling portion 73 are close to each other, and the movement of the DC jack 301 or the power cable 300 can be further suppressed when the apparatus main body 2 is being rotated.

In the present embodiment, the vertical wall portion 6a and the third coupling portion 73 overlap with each other when viewed from the X axis direction in both the normal reading posture and the booklet reading posture, but the vertical wall portion 6a and the third coupling portion 73 may overlap with each other when viewed from the X axis direction in either the normal reading posture or the booklet reading posture.

Further, instead of the third coupling portion 73, another coupling portion may overlap with the vertical wall portion 6a when viewed from the X axis direction.

At least one coupling portion is positioned above the main body rotation shaft 6c in the vertical direction regardless of the posture of the apparatus main body 2. Specifically, in the present embodiment, the first coupling portion 71 and the second coupling portion 72 are positioned above the main body rotation shaft 6c in the vertical direction regardless of the posture of the apparatus main body 2.

As a result, when the coupling target that is coupled to the coupling portion positioned above the main body rotation shaft 6c in the vertical direction is a cable in particular, it is possible to prevent the cable more reliably from coming into contact with the placement surface G of the apparatus and hindering the rotation of the apparatus main body 2 when the apparatus main body 2 is rotated.

Figure 13:
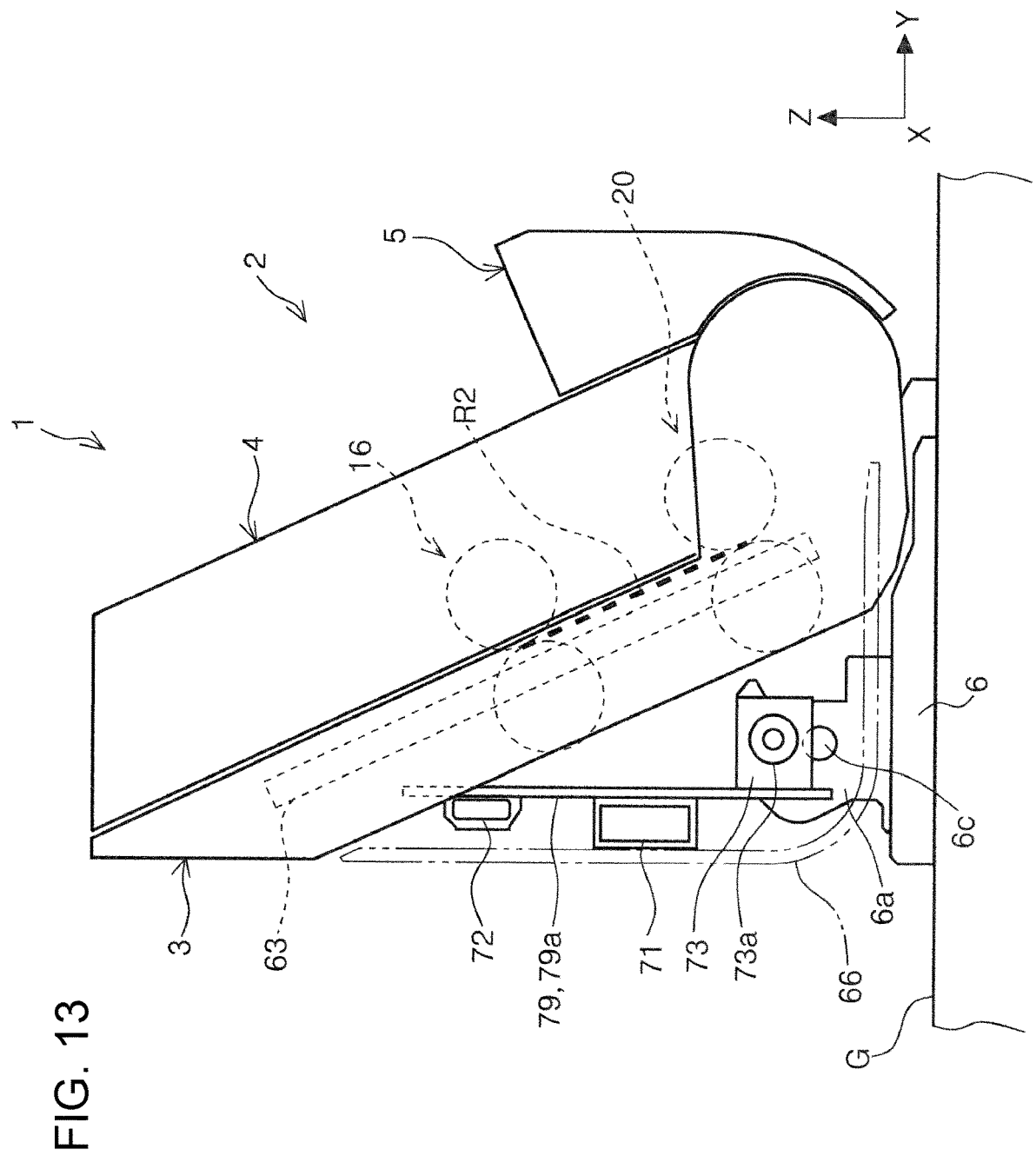
FIG. 13 is a view of the scanner in which the back surface cover of the first unit is removed as viewed from the side.

The posture of the apparatus main body 2 includes the normal reading posture in which an angle that is formed by the read transporting path R2 with the placement surface G of the main body supporting portion 6 is an acute angle, and the booklet reading posture in which the angle is smaller than that of the normal reading posture. The second coupling portion 72 is positioned vertically above the first coupling portion 71 regardless of the posture of the apparatus main body 2. The circuit substrate 79 including the first coupling portion 71 and the second coupling portion 72 is provided in a posture in which a substrate surface 79a stands such that the substrate surface 79a forms an acute angle with the read transporting path R2 as illustrated in FIG. 13, on the apparatus back surface side with respect to the read transporting path R2. The dimension of the second coupling portion 72 in the thickness direction of the circuit substrate (in the X axis direction in the state of FIG. 13) is smaller than the dimension of the first coupling portion 71 in the thickness direction.

As a result, the following effects can be obtained. That is, in FIG. 13, a space on the back surface side of the read transporting path R2 decreases upward in the vertical direction.

In such a configuration, since the second coupling portion 72, which is positioned vertically above the first coupling portion 71, has the dimension in the thickness direction of the circuit substrate 79 smaller than the dimension in the thickness direction of the first coupling portion 71, the first coupling portion 71 and the second coupling portion 72 are disposed as the space on the back surface side of the read transporting path R2 decreases upward, thereby it is possible to suppress the increase in size of the apparatus by efficiently disposing components.

The apparatus main body 2 may include a plurality of circuit substrates. Each coupling portion may be provided on a different circuit substrate.

The plurality of coupling portions, which are included in the scanner 1, include the third coupling portion 73 positioned vertically below the second coupling portion 72 regardless of the posture of the apparatus main body 2, and the first coupling portion 71, the second coupling portion 72, and the third coupling portion 73 are provided on the circuit substrate 79. As illustrated in FIG. 13, the dimension of the third coupling portion 73 in the thickness direction of the circuit substrate 79 is larger than the dimension of the second coupling portion 72 in the thickness direction.

As a result, the following effects can be obtained. That is, in FIG. 13, a space on the back surface side of the read transporting path R2 increases downward in the vertical direction. As described above, the third coupling portion 73 is disposed as the space on the back surface side of the read transporting path R2 increases downward, thereby it is possible to suppress the increase in size of the apparatus by efficiently disposing the components.

In the present embodiment, the first coupling portion 71 is a coupling portion compliant with a USB Type-A, the second coupling portion 72 is a coupling portion compliant with a USB Type-C, and the third coupling portion 73 is a coupling portion for supplying the electric power to the apparatus main body 2.

However, it goes without saying that each coupling portion is not limited to the above embodiment and can be changed as appropriate. For example, the USB standard includes a USB Type-B, and any of the above coupling portions may be a coupling portion compliant with the USB Type-B. A plurality of the same coupling portions compliant with any of the USB standards may be provided. For example, two coupling portions compliant with the USB Type-C may be provided. The coupling portion of the present embodiment may be further provided with a coupling portion compliant with the USB Type-B.

The coupling portion that is compliant with the USB Type-A does not necessarily have to be provided. Further, a configuration may be used in which only a coupling portion for supplying the electric power to the apparatus main body 2 and a coupling portion compliant with the USB Type-C are provided.

The apparatus main body 2 includes the pair of first transporting rollers 16 and the pair of second transporting rollers 20 that transport the documents, and the transporting motor 50 that drives these pairs of the transporting rollers, and the transporting motor 50 is provided closer to the side surface (the side surface 2b) in the −X direction opposite to the side surface (the side surface 2a) in the +X direction in which each of the above coupling portions is provided (see FIG. 7). The fact that the transporting motor 50 is provided closer to the side surface in the −X direction means that the transporting motor 50 is provided in an area in the −X direction with respect to the center position Xc in the X axis direction of the apparatus main body 2.

With such a configuration, it is possible to suppress the increase in size of the apparatus by separately disposing the transporting motor 50 and each of the above coupling portions from each other.

In FIG. 7, the reference numeral 51 is a drive pulley provided on the drive shaft of the transporting motor 50, the reference numeral 53 is a driven pulley, and the reference numeral 52 is a belt hung around the drive pulley 51 and the driven pulley 53. The driving force of the transporting motor 50 is transmitted from the driven pulley 53 to each roller via a power transmission section (not illustrated).

In FIG. 7, the reference numeral 89 is a first rotation detection portion. The control portion (not illustrated) can ascertain the rotation amount of each roller provided in the document transporting path by detecting the rotation amount of the transporting motor 50 by the first rotation detection portion 89.

The first rotation detection portion 89 is a rotary encoder that includes a rotation disk 89a and a detection portion 89b.

Figure 14:
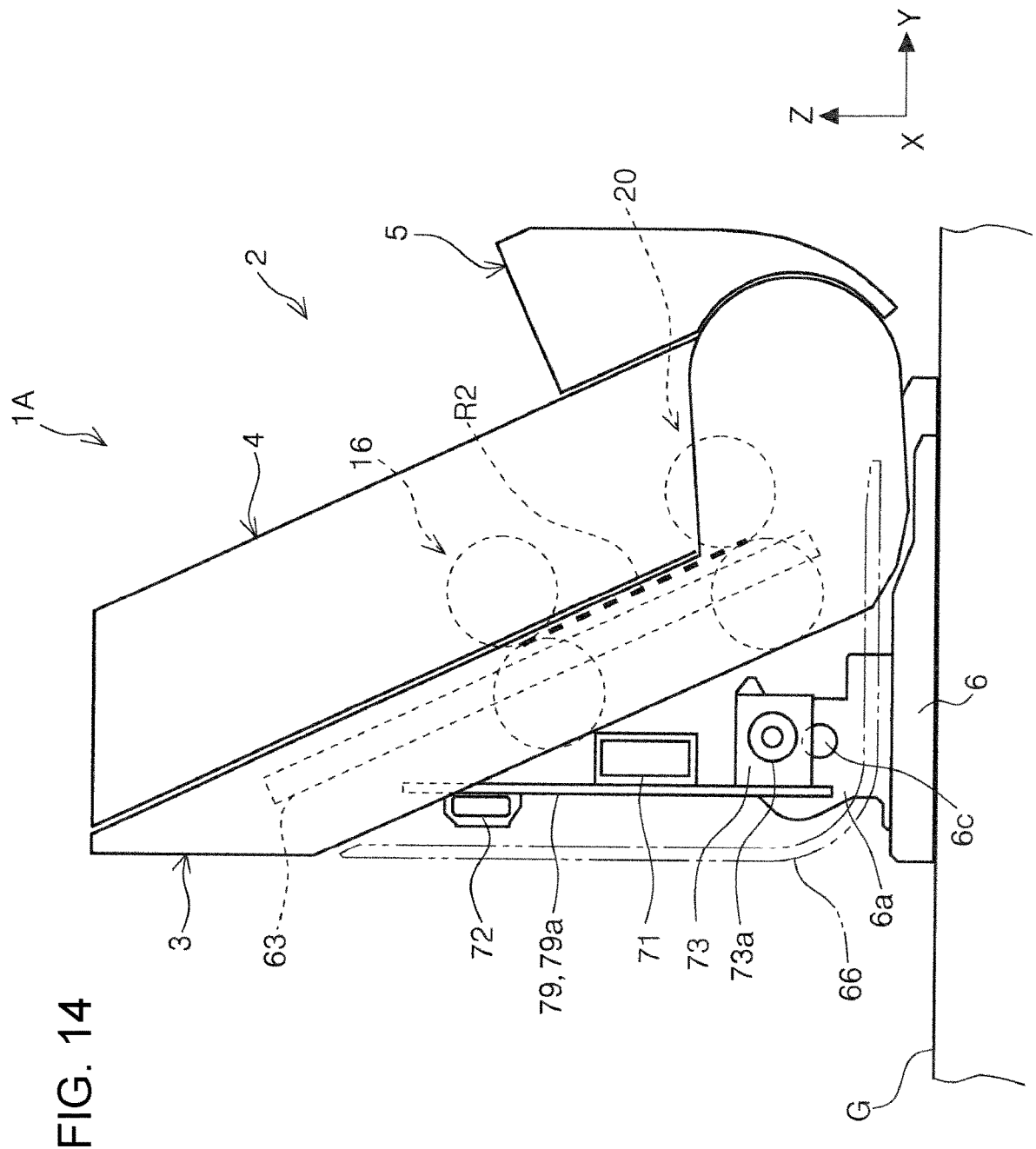
FIG. 14 is a view of a scanner according to another embodiment in a state in which the back surface cover of the first unit is removed as viewed from the side.

Each of the above-mentioned coupling portions may be disposed as illustrated in FIG. 14. In FIG. 14, in the scanner 1A, it differs from the configuration illustrated in FIG. 13 in that the first coupling portion 71 is provided in the +Y direction with respect to the circuit substrate 79.

Figure 15:
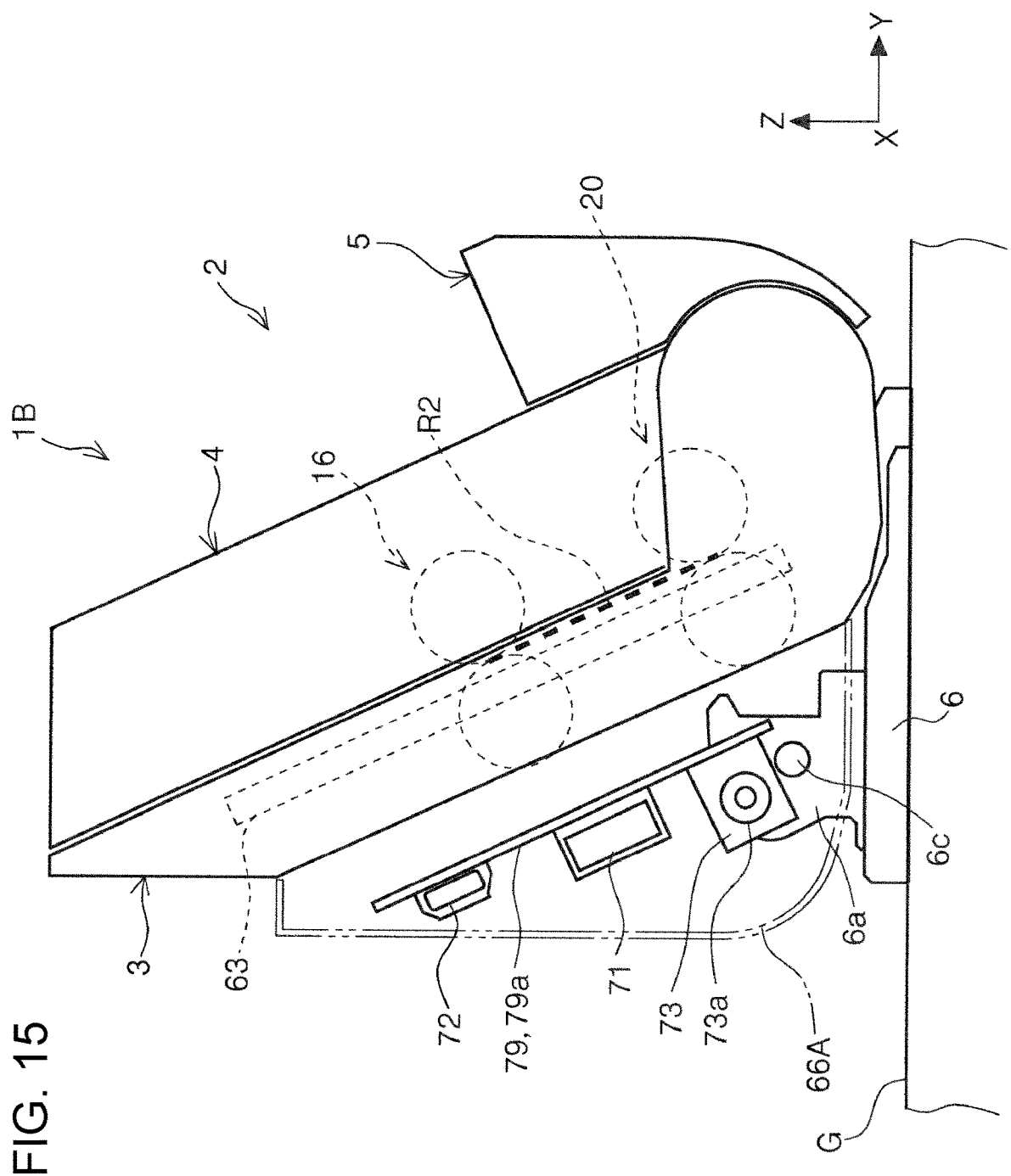
FIG. 15 is a view of a scanner according to still another embodiment in a state in which the back surface cover of the first unit is removed as viewed from the side.

The circuit substrate 79 can also be provided in the posture illustrated in FIG. 15. In FIG. 15, in the scanner 1B, the substrate surface 79a of the circuit substrate 79 is in a posture along the read transporting path R2. The posture in which the substrate surface 79a of the circuit substrate 79 is along the read transporting path R2 means that the substrate surface 79a of the circuit substrate 79 is completely parallel to the read transporting path R2 or forms a slight angle (for example, less than 5°). In FIG. 15, the reference numeral 66A is a modification example of the back surface cover 66 described above.

Figure 16:
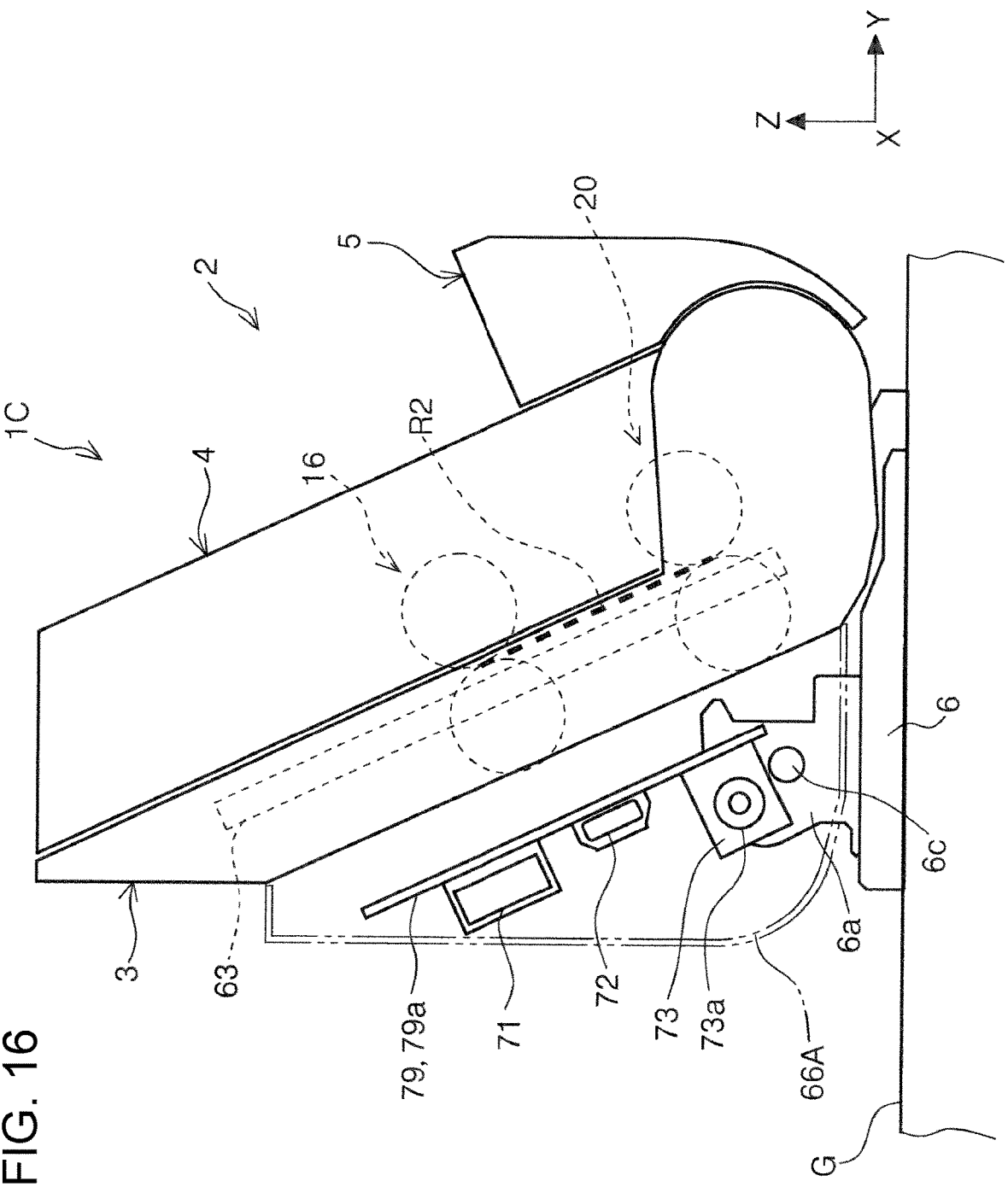
FIG. 16 is a view of a scanner according to still another embodiment in a state in which the back surface cover of the first unit is removed as viewed from the side.

Each coupling portion illustrated in FIG. 15 may be disposed as illustrated in FIG. 16. In FIG. 16, in the scanner 1C, the second coupling portion 72 is provided at the lower side with respect to the first coupling portion 71.

Further, the disposition of each coupling portion or the posture of the circuit substrate 79 described above is an example, and can be changed as appropriate.

The diameter of the USB cable 200 of the present embodiment is 3.6 mm, and the diameter of the power cable 300 is 6.0 mm. The USB cable 200 is easier to bend than the power cable 300. In other words, it can be said that the USB cable 200 has a lower bending rigidity than the power cable 300.

A storage medium having a coupling portion compliant with the USB Type-C, for example, a USB memory, may be coupled to the second coupling portion 72 of the present embodiment. In a state in which each of the storage medium, for example, USB memories is coupled to the second coupling portion 72 and the first coupling portion 71, the positions of the second coupling portion 72 and the first coupling portion 71 may be provided at positions where the storage medium does not interfere with the coupling portions.

The present disclosure is not limited to the embodiments described above, and various modifications can be made within the scope of the disclosure described in the claims, and needless to say, the various modifications are also included in the scope of the present disclosure.

Although the above embodiment relates to the scanner 1 which is an example of the image reading apparatus, the present disclosure can also be applied to a processing apparatus that performs a predetermined processing on the document. The predetermined processing is, for example, recording processing for performing recording on the document, processing for performing punching on the document, and staple processing for binding the document. Specifically, for example, the present disclosure may be applied to a recording apparatus including a recording portion that performs recording on the document instead of the first reading portion 32 and the second reading portion 33. The present disclosure may be applied to a processing apparatus including a processing portion that performs processing for performing punching on the document or staple processing for binding a document instead of the first reading portion 32 and the second reading portion 33.

What is claimed is:
1. An image reading apparatus comprising:
an apparatus main body including a reading portion that reads an image of a document being transported; and
a main body supporting portion rotatably supporting the apparatus main body such that the apparatus main body is configured to take a plurality of postures, wherein the apparatus main body includes at least one coupling portion to which a coupling target is coupled, the coupling portion is provided on a side of the apparatus main body, the side intersecting a first direction along a rotation shaft of the apparatus main body, and the plurality of postures of the apparatus main body includes a first posture in which an angle formed by a read transporting path, which faces the reading portion, with a placement surface of the main body supporting portion is a first angle, and a second posture in which the angle is smaller than the first angle.

2. The image reading apparatus according to claim 1, wherein the rotation shaft of the apparatus main body and the at least one coupling portion overlap with each other, when the apparatus main body is in at least one posture among the plurality of postures and is viewed from the first direction.

3. The image reading apparatus according to claim 1, further comprising:

a motor that is a power source for rotation of the apparatus main body; and a rotation converting section converting rotation of the motor into the rotation of the apparatus main body.

4. The image reading apparatus according to claim 3, wherein the motor is provided in the apparatus main body, the rotation converting section includes a toothed wheel that is a toothed wheel rotatably provided in the apparatus main body and is rotated by power of the motor, and a toothed portion that is a toothed portion fixed to the main body supporting portion and that meshes with the toothed wheel, and the toothed portion is formed at a vertical wall portion that rises from the main body supporting portion, and includes a part where the vertical wall portion and the at least one coupling portion overlap with each other in a state in which the apparatus main body is in at least one posture among the plurality of postures when viewed from the first direction.

5. The image reading apparatus according to claim 1, wherein the at least one coupling portion is positioned above the rotation shaft in a vertical direction.

6. The image reading apparatus according to claim 5, wherein the at least one coupling portion comprises at least two coupling portions, the at least two coupling portions include a first coupling portion and a second coupling portion, and the first coupling portion and the second coupling portion are positioned above the rotation shaft in the vertical direction.

7. The image reading apparatus according to claim 6, wherein the second coupling portion is positioned vertically above the first coupling portion when the apparatus main body is in the first posture and in the second posture, a circuit substrate including the first coupling portion and the second coupling portion is provided in a posture in which a substrate surface is along the read transporting path or in a posture in which the substrate surface stands such that the substrate surface forms an acute angle with the read transporting path, on an apparatus back surface side with respect to the read transporting path, and a dimension of the second coupling portion in a thickness direction of the circuit substrate is smaller than a dimension of the first coupling portion in the thickness direction.

8. The image reading apparatus according to claim 7, wherein the plurality of coupling portions includes a third coupling portion positioned vertically below the second coupling portion when the apparatus main body is in the first posture and in the second posture, the first coupling portion, the second coupling portion, and the third coupling portion are provided on the circuit substrate, and a dimension of the third coupling portion in the thickness direction of the circuit substrate is larger than the dimension of the second coupling portion in the thickness direction.

9. The image reading apparatus according to claim 8, wherein the first coupling portion is a coupling portion compliant with a USB Type-A, the second coupling portion is a coupling portion compliant with a USB Type-C, and the third coupling portion is a coupling portion for supplying electric power to the apparatus main body.

10. The image reading apparatus according to claim 1, wherein the apparatus main body includes a transporting section that transports a document, and a transporting motor that drives the transporting section, and the transporting motor is provided closer to a side surface opposite to the side surface where the coupling portion is provided.

11. The image reading apparatus according to claim 1, the plurality of coupling portions includes a coupling portion compliant with a USB Type-C, and a coupling portion for supplying electric power to the apparatus main body.

12. The image reading apparatus according to claim 11, the coupling portion compliant with a USB Type-C is positioned vertically above the coupling portion for supplying electric power to the apparatus main body in a vertical direction.

* * * * *